(12) United States Patent
Van Vlassenrode et al.

(10) Patent No.: US 12,410,619 B2
(45) Date of Patent: Sep. 9, 2025

(54) FLOOR PANEL

(71) Applicant: FLOORING INDUSTRIES LIMITED, SARL, Bertrange (LU)

(72) Inventors: Kristof Van Vlassenrode, Deinze (BE); Paul Brusseel, Nazareth (BE); Nick Vanhulle, Anzegem (BE); Jochen Bossuyt, Tiegem (BE)

(73) Assignee: UNILIN BV, Wielsbeke (BE)

( * ) Notice: Subject to any disclaimer, the term of this patent is extended or adjusted under 35 U.S.C. 154(b) by 105 days.

(21) Appl. No.: 18/300,600

(22) Filed: Apr. 14, 2023

(65) Prior Publication Data

US 2023/0250642 A1 Aug. 10, 2023

Related U.S. Application Data

(63) Continuation of application No. 17/361,895, filed on Jun. 29, 2021, now Pat. No. 11,668,105, which is a (Continued)

(30) Foreign Application Priority Data

Nov. 22, 2016 (BE) .................................. 2016/5869

(51) Int. Cl.
*E04F 15/02* (2006.01)
*B29C 70/08* (2006.01)
(Continued)

(52) U.S. Cl.
CPC ........ *E04F 15/02038* (2013.01); *B29C 70/08* (2013.01); *B29C 70/086* (2013.01);
(Continued)

(58) Field of Classification Search
CPC ..... B32B 5/245; B32B 27/065; B32B 27/304; E04F 15/107
See application file for complete search history.

(56) References Cited

U.S. PATENT DOCUMENTS 4,230,521 A 10/1980 Cobb et al.
4,546,024 A 10/1985 Brown
(Continued)

FOREIGN PATENT DOCUMENTS

CN 104619936 A 5/2015
CN 105908946 B 7/2018
(Continued)

OTHER PUBLICATIONS

What is EVA Foam? How do you choose which foam to use?, Aug. 25, 2020, <https://www.polymershapesfab.com/what-is-eva-foam-how-do-you-choose-which-foam-to-use/> (Year: 2020).*
(Continued)

*Primary Examiner* — Brent W Herring
(74) *Attorney, Agent, or Firm* — Workman Nydegger

(57) ABSTRACT

A floor panel with a substrate and a decoration provided thereon. The substrate includes at least a foamed layer of thermoplastic material and at least a reinforcement layer. Additionally, a method for manufacturing such floor panels with a substrate and a decoration, where the substrate includes at least a foamed layer of thermoplastic material and at least a reinforcement layer.

19 Claims, 8 Drawing Sheets

Related U.S. Application Data continuation of application No. 16/345,865, filed as application No. PCT/IB2017/056856 on Nov. 3, 2017, now Pat. No. 11,091,919.

(60) Provisional application No. 62/420,094, filed on Nov. 10, 2016.

(51) Int. Cl.

| | | |
|---|---|---|
| *B32B 5/02* | (2006.01) | |
| *B32B 5/24* | (2006.01) | |
| *B32B 27/06* | (2006.01) | |
| *B32B 27/30* | (2006.01) | |
| *B44C 5/04* | (2006.01) | |
| *E04F 15/10* | (2006.01) | |
| *B29K 27/06* | (2006.01) | |
| *B29K 105/04* | (2006.01) | |
| *B29K 309/08* | (2006.01) | |
| *B29L 31/00* | (2006.01) | |
| *B32B 5/16* | (2006.01) | |
| *B32B 5/18* | (2006.01) | |

(52) U.S. Cl.
CPC ............. *B32B 5/022* (2013.01); *B32B 5/024* (2013.01); *B32B 5/245* (2013.01); *B32B 27/065* (2013.01); *B32B 27/304* (2013.01); *B44C 5/0407* (2013.01); *E04F 15/105* (2013.01); *E04F 15/107* (2013.01); *B29K 2027/06* (2013.01); *B29K 2105/04* (2013.01); *B29K 2309/08* (2013.01); *B29L 2031/732* (2013.01); *B32B 5/02* (2013.01); *B32B 5/16* (2013.01); *B32B 5/18* (2013.01); *B32B 27/30* (2013.01); *B32B 2262/101* (2013.01); *B32B 2264/0242* (2013.01); *B32B 2266/0235* (2013.01); *B32B 2419/04* (2013.01); *B32B 2471/00* (2013.01); *E04F 2201/0146* (2013.01); *E04F 2201/0153* (2013.01); *E04F 2201/0552* (2013.01); *E04F 2290/042* (2013.01)

(56) References Cited

U.S. PATENT DOCUMENTS

| | | | |
|---|---|---|---|
| 6,454,048 B1 * | 9/2002 | Alts | B60R 13/0815 |
| | | | 181/290 |
| 7,358,286 B2 | 4/2008 | Hopfmann et al. | |
| 8,171,691 B1 | 5/2012 | Stone | |
| 8,549,807 B2 | 10/2013 | Meersseman et al. | |
| 9,163,414 B2 | 10/2015 | Meerseman et al. | |
| 9,212,494 B2 | 12/2015 | Meerseman et al. | |
| 9,322,184 B2 | 4/2016 | Meerseman et al. | |
| 9,527,975 B2 | 12/2016 | Fang | |
| 9,643,377 B2 | 5/2017 | Song | |
| 9,745,758 B2 | 8/2017 | Baert et al. | |
| 9,783,995 B2 | 10/2017 | Meerseman et al. | |
| 10,094,123 B2 | 10/2018 | Meersseman et al. | |
| 10,100,533 B2 | 10/2018 | Meersseman et al. | |
| 10,233,655 B2 | 3/2019 | Meersseman et al. | |
| 11,091,919 B2 | 8/2021 | Van Vlassenrode et al. | |
| 11,136,765 B2 * | 10/2021 | De Rick | E04F 15/02038 |
| 11,149,446 B2 | 10/2021 | Baert et al. | |
| 11,668,105 B2 | 6/2023 | Van Vlassenrode et al. | |
| 11,939,762 B2 * | 3/2024 | Turnquist | F03D 13/10 |
| 2004/0055705 A1 | 3/2004 | Shutic et al. | |
| 2006/0052497 A1 | 3/2006 | Hopfmann et al. | |
| 2006/0099405 A1 | 5/2006 | Guiselin et al. | |
| 2007/0260006 A1 | 11/2007 | Whitson et al. | |
| 2009/0308001 A1 | 12/2009 | Wu et al. | |
| 2011/0296780 A1 * | 12/2011 | Windmoller | B32B 27/304 |
| | | | 156/182 |
| 2012/0266555 A1 | 10/2012 | Cappelle | |
| 2013/0067842 A1 * | 3/2013 | Meersseman | E04F 15/102 |
| | | | 52/311.1 |
| 2013/0183506 A1 | 7/2013 | Vermeulen | |
| 2014/0020820 A1 | 1/2014 | Meerseman et al. | |
| 2014/0107507 A1 | 4/2014 | Ghosh et al. | |
| 2014/0109507 A1 | 4/2014 | Dossche et al. | |
| 2014/0147585 A1 | 5/2014 | Smith | |
| 2014/0290158 A1 | 10/2014 | Meerseman et al. | |
| 2015/0121793 A1 | 5/2015 | Segaert et al. | |
| 2015/0167320 A1 | 6/2015 | Meerseman et al. | |
| 2015/0267025 A1 | 9/2015 | Fang | |
| 2015/0375471 A1 | 12/2015 | Song | |
| 2016/0083965 A1 | 3/2016 | Baert et al. | |
| 2016/0160508 A1 | 6/2016 | Meerseman et al. | |
| 2016/0255977 A1 * | 9/2016 | Burkhalter | B32B 25/10 |
| 2017/0044778 A1 * | 2/2017 | Brickner | B32B 27/304 |
| 2017/0050408 A1 | 2/2017 | Park et al. | |
| 2017/0247890 A1 | 8/2017 | Bladh et al. | |
| 2017/0362833 A1 | 12/2017 | Meersseman et al. | |
| 2018/0044925 A1 * | 2/2018 | Koh | B29C 48/0012 |
| 2018/0245353 A1 | 8/2018 | Meersseman et al. | |
| 2018/0245354 A1 | 8/2018 | Meersseman et al. | |
| 2018/0283014 A1 * | 10/2018 | Hodgkins | E04F 15/105 |
| 2018/0298621 A1 | 10/2018 | Courey et al. | |
| 2018/0298622 A1 | 10/2018 | Courey et al. | |
| 2019/0016865 A1 | 1/2019 | Zhou | |
| 2019/0024388 A1 * | 1/2019 | Devos | E04F 15/02038 |
| 2019/0040634 A1 | 2/2019 | Meersseman et al. | |
| 2019/0063078 A1 | 2/2019 | Meersseman et al. | |
| 2019/0063079 A1 | 2/2019 | Meersseman et al. | |
| 2019/0153734 A1 | 5/2019 | Van Vlassenrode et al. | |
| 2019/0169858 A1 | 6/2019 | Courey et al. | |
| 2019/0316363 A1 | 10/2019 | Courey et al. | |
| 2020/0277796 A1 * | 9/2020 | De Rick | E04F 15/02038 |
| 2023/0250642 A1 | 8/2023 | Van Vlassenrode et al. | |

FOREIGN PATENT DOCUMENTS

| | | |
|---|---|---|
| DE | 102005021662 A1 | 11/2006 |
| EP | 1026341 A2 | 8/2000 |
| EP | 2402155 A1 | 1/2012 |
| EP | 3351703 A1 | 7/2018 |
| EP | 3538721 A1 | 9/2019 |
| GB | 1248060 | 9/1971 |
| JP | S62160211 A | 7/1987 |
| JP | H06185181 A | 7/1994 |
| KR | 1020130077823 A | 7/2013 |
| RU | 2013101800 A | 8/2014 |
| WO | 9747834 A1 | 12/1997 |
| WO | 0198603 A2 | 12/2001 |
| WO | 2011141849 A2 | 11/2011 |
| WO | 2012004701 A2 | 1/2012 |
| WO | 2013026559 A2 | 2/2013 |
| WO | 2013178561 A2 | 12/2013 |
| WO | 2013179261 A1 | 12/2013 |
| WO | 2014006593 A1 | 1/2014 |
| WO | 2014065953 A1 | 5/2014 |
| WO | 2015170274 A1 | 11/2015 |
| WO | 2016001859 A1 | 1/2016 |
| WO | 2016016864 A1 | 2/2016 |
| WO | 2016113377 A1 | 7/2016 |
| WO | 2018087638 A1 | 5/2018 |

OTHER PUBLICATIONS

International Search Report from PCT Application No. PCT/IB2017/056856, Feb. 26, 2018.

Written Opinion from PCT Application No. PCT/IB2017/056856, Feb. 26, 2018.

Belgian Search Report from Corresponding BE Application No. BE 201605869, Jun. 30, 2017.

KR 1020160101863, filed Aug. 10, 2016 to Applicant Nox Corporation, which is a priority document of US 20180044925 to Koh et al.

(56) References Cited

OTHER PUBLICATIONS

Certified Translation of KR1020160101863, translated by Eun Joo Park.

* cited by examiner

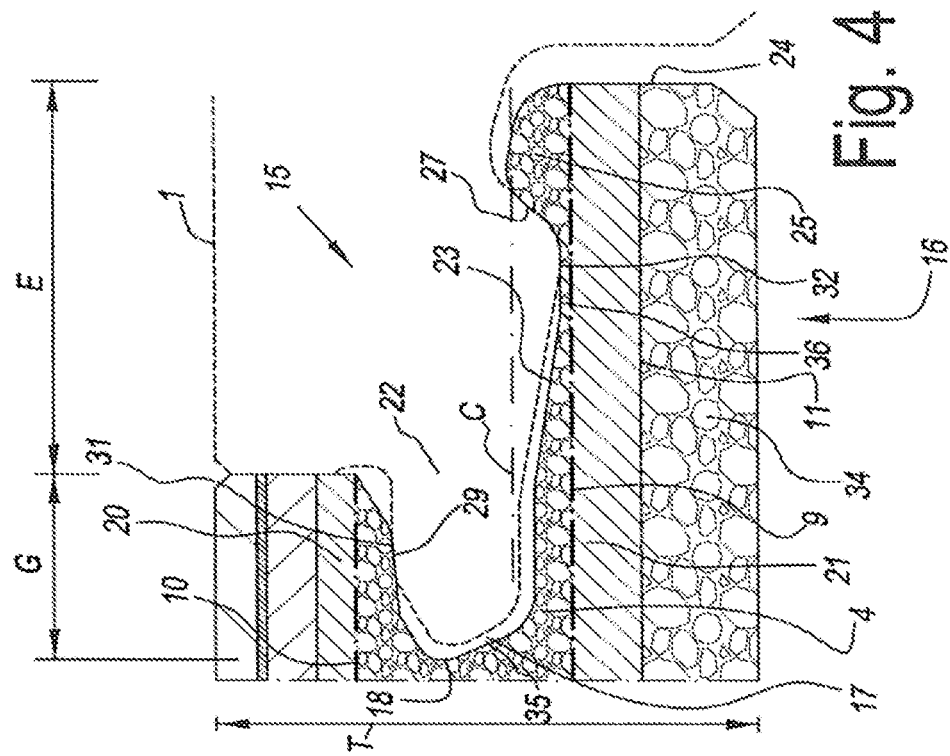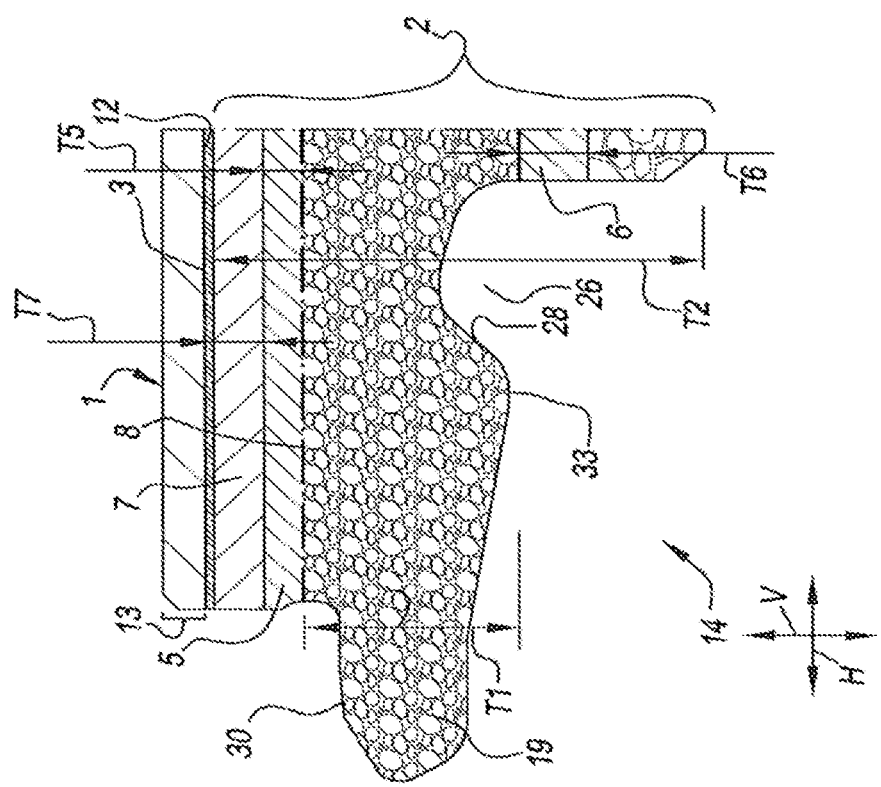
Fig. 4

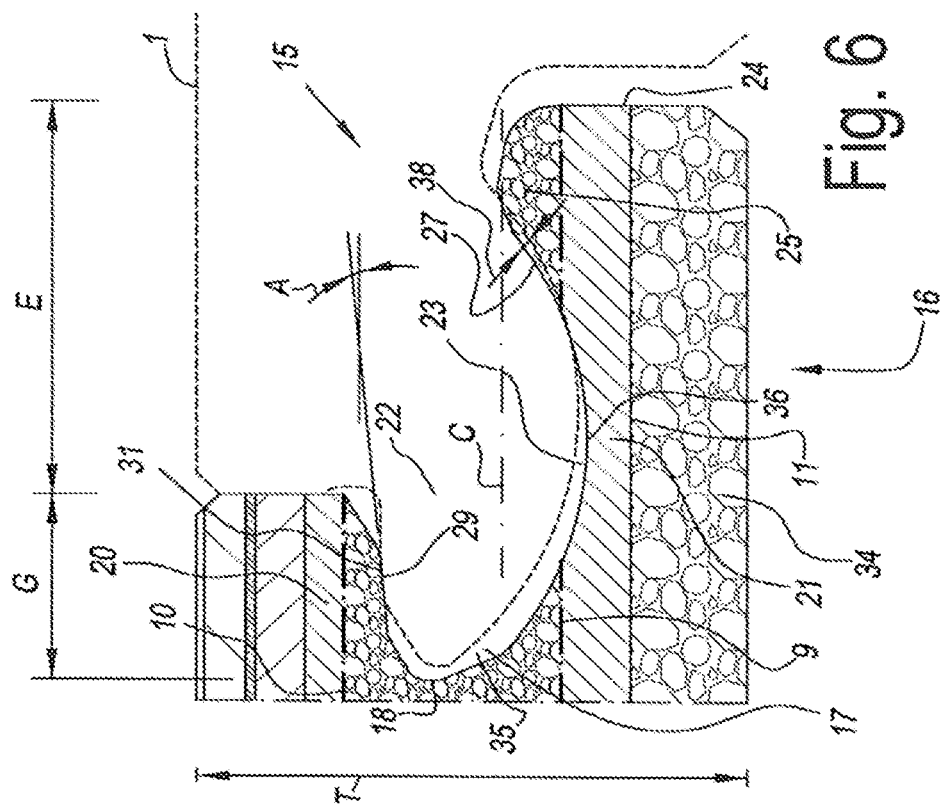
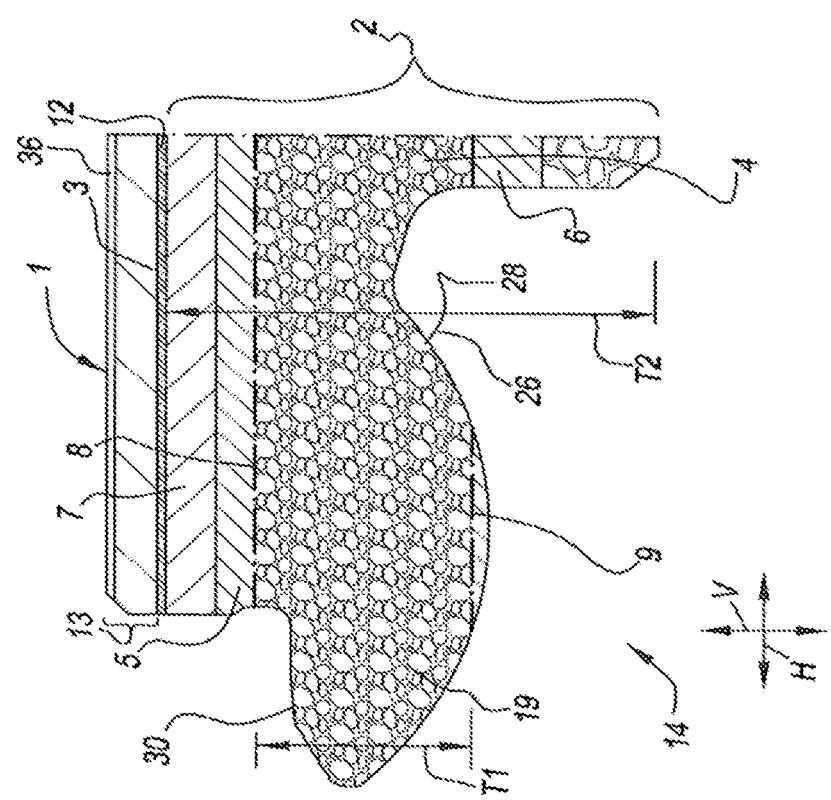
Fig. 6

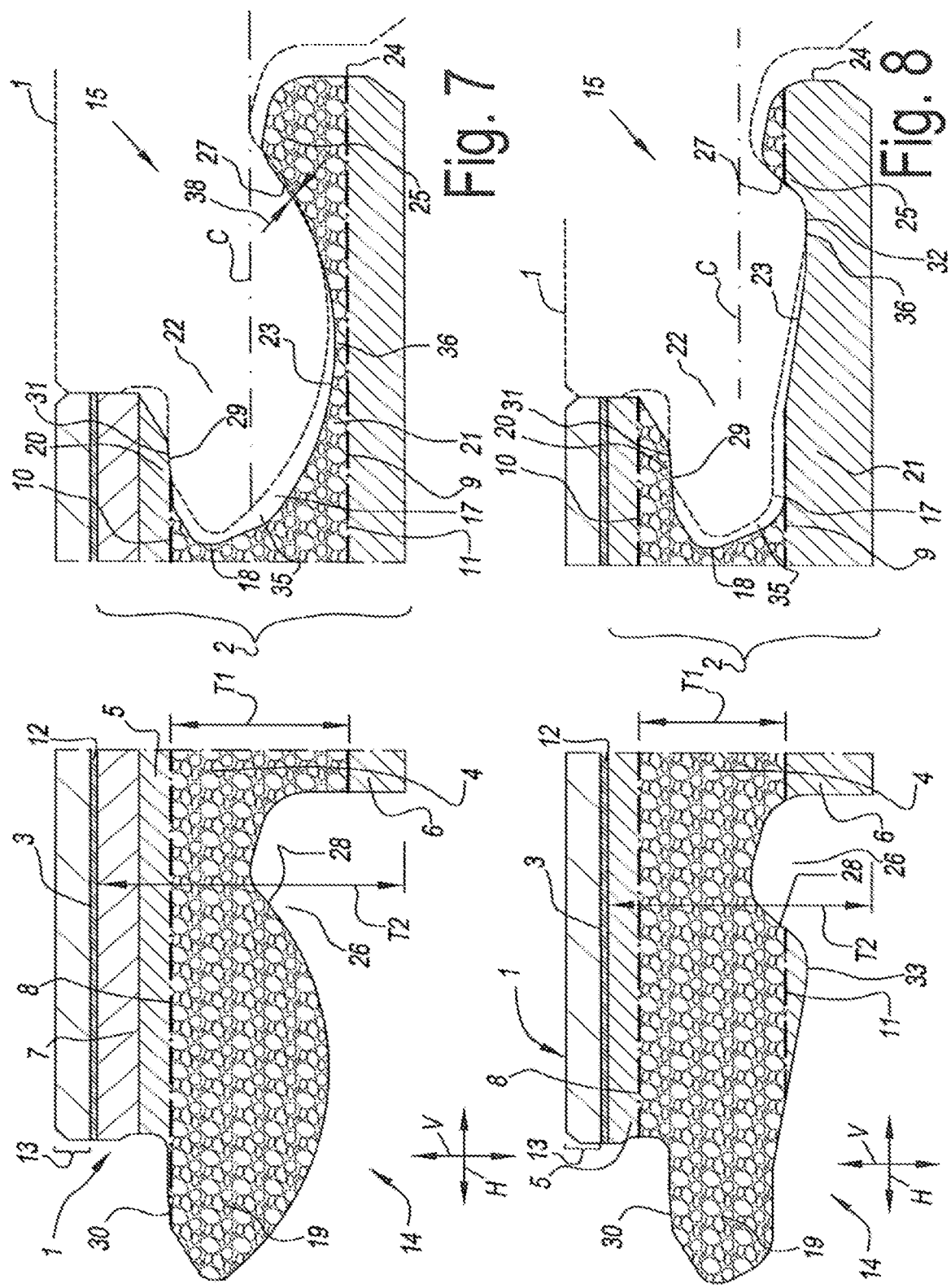

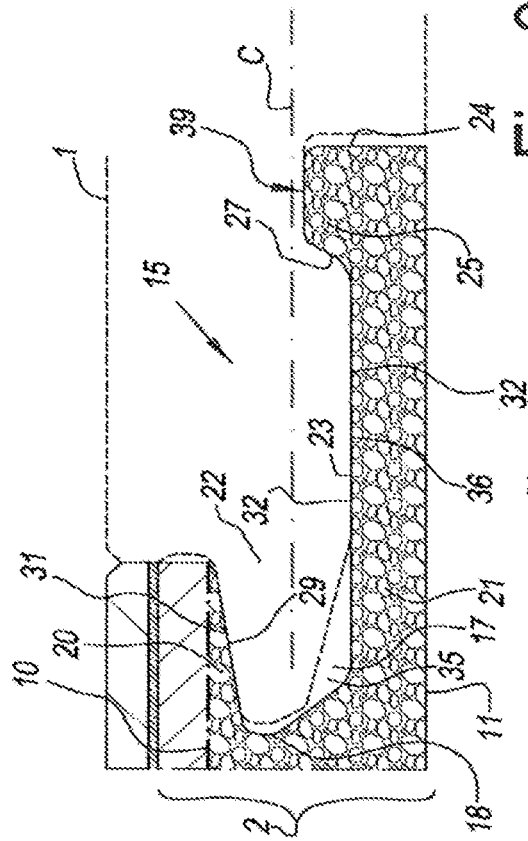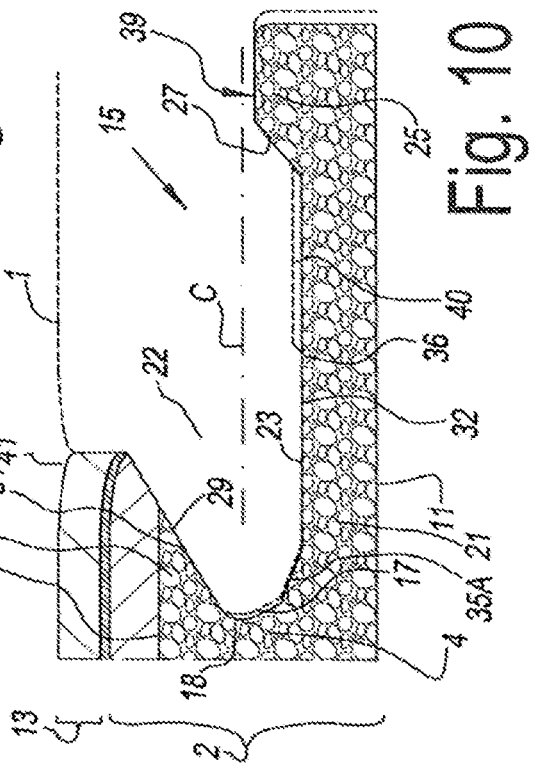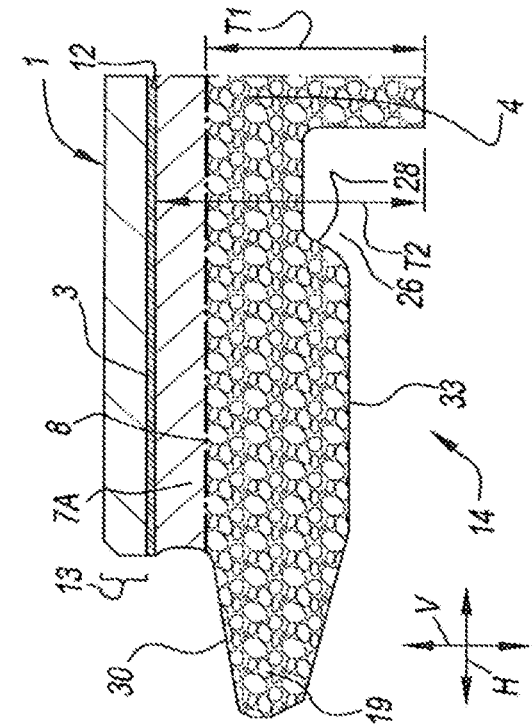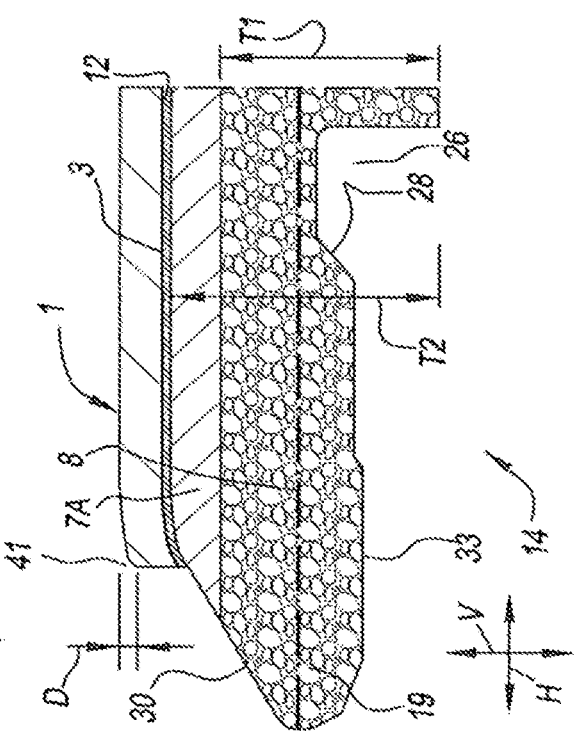
Fig. 9
Fig. 10

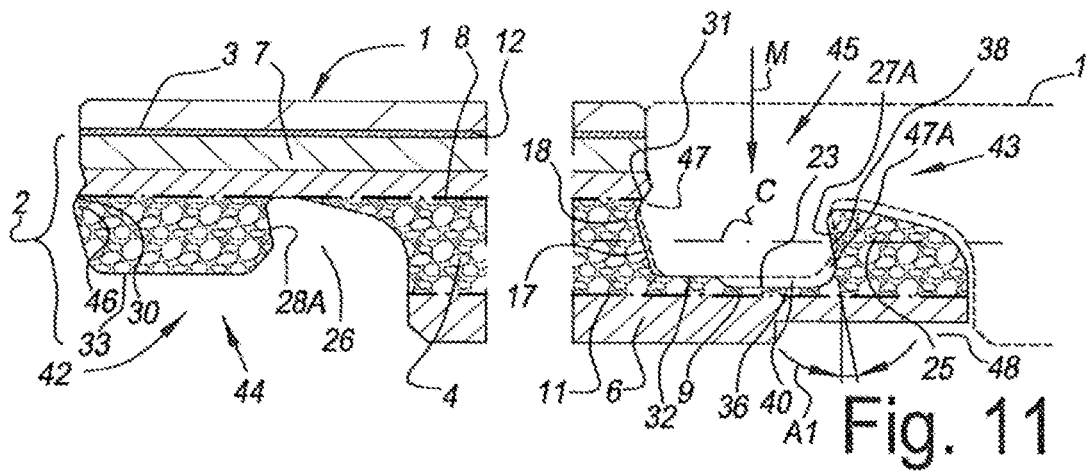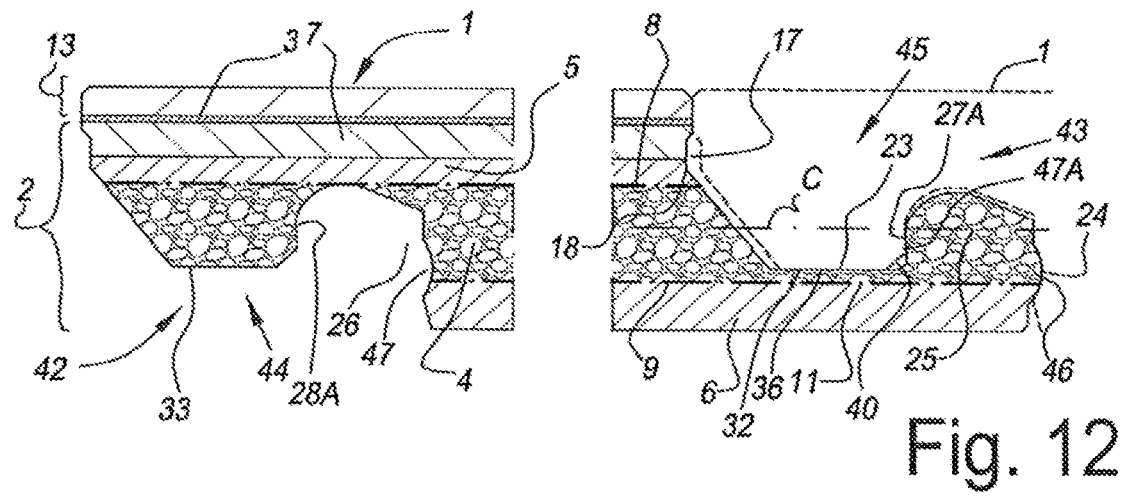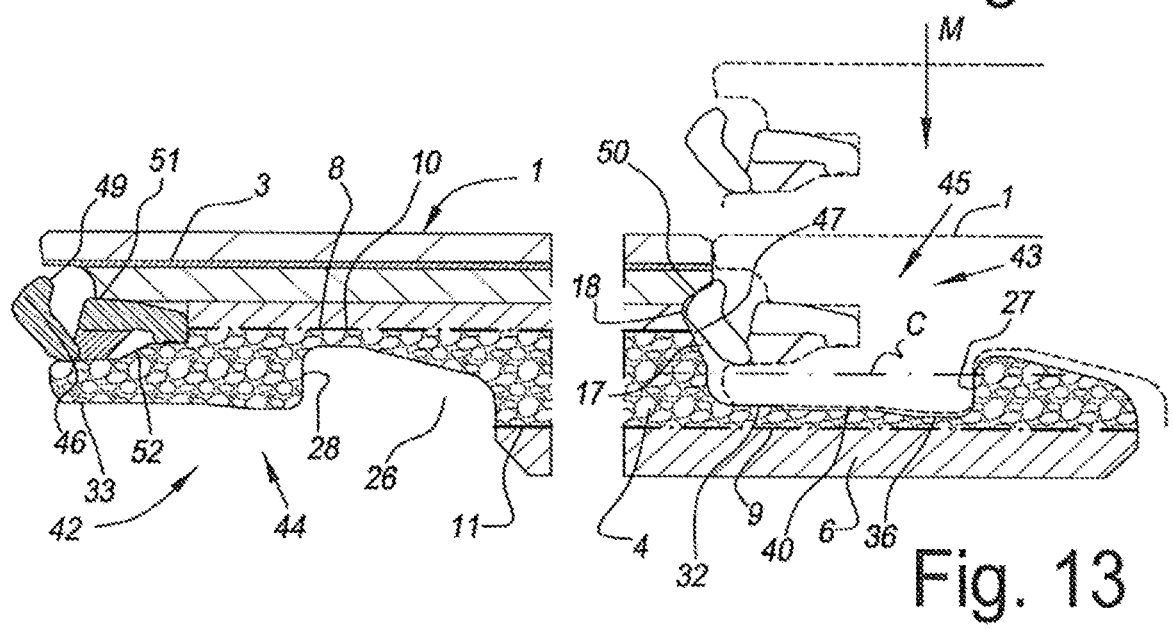

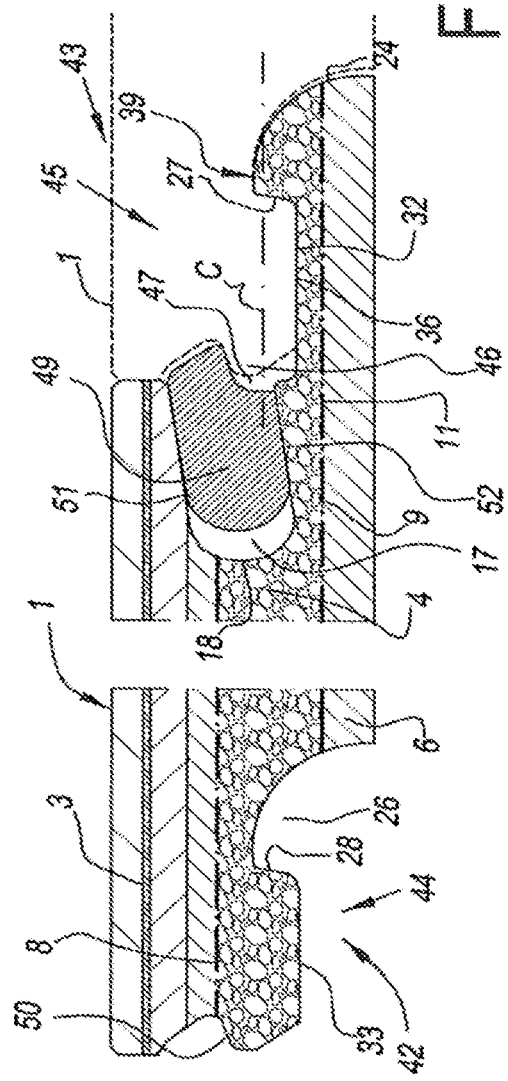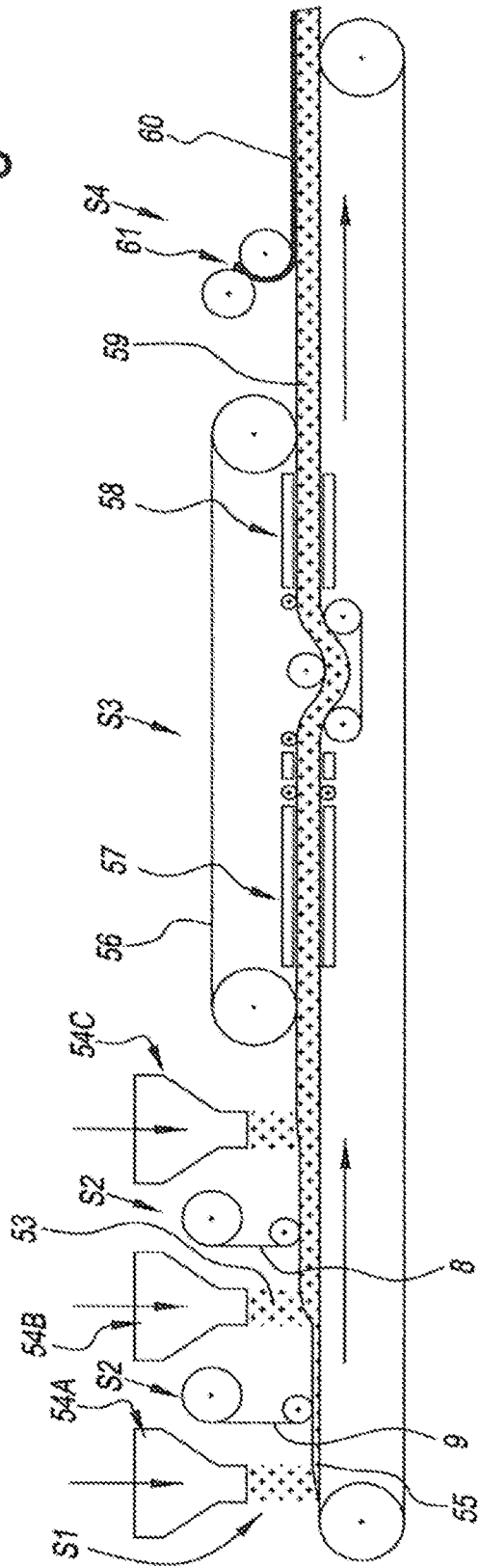

FLOOR PANEL

CROSS REFERENCE TO RELATED APPLICATIONS

This application is a continuation of U.S. application Ser. No. 17/361,895, filed Jun. 29, 2021, which is a continuation of U.S. application Ser. No. 16/345,865, filed Apr. 29, 2019, now U.S. Pat. No. 11,091,919, which is a 371 nationalization of PCT/IB2017/056856, filed Nov. 3, 2017, which claims the benefit under 35 U.S.C. 119(e) to the U.S. provisional applications U.S. 62/420,094, filed Nov. 10, 2016, which is incorporated herein by reference.

The present invention relates to a floor panel and to a method for manufacturing a floor panel.

BACKGROUND OF THE INVENTION

Related Art

More particularly, the invention relates to a floor panel with a substrate and a decoration provided thereon. Such floor panels are widely known as such, for example, in the form of MDF or HOF panels with a printed decoration, such as the laminate panels of WO 97/47834, in the form of vinyl panels, such as in WO 2013/026559, or in the form of so-called WPC (Wood Plastic Composite) panels with a vinyl top layer, such as in WO 2014/065953.

In the case of WO 2013/026559, this relates to water-resistant floor panels with a substrate of soft or flexible polyvinyl chloride or PVC. Moreover, the decoration and the provided thereabove finishing layer of PVC offers a pleasant walking comfort without pronounced ticking sound, as this may be the case with laminate panels indeed. With the floor panels of WO'559, however, there is the risk of telegraphy effects. Herein, after a certain period of time unevennesses in the underlying surface will become visible on the surface of the floor covering, which is unattractive. Apart therefrom, such floor panel is relatively difficult to install, as it, due to the flexibility of the carrier, will bend or deform easily. The soft substrate is sensitive to dimensional changes due to temperature variations. Problems may arise with local warming of the floor covering, for example, with direct incidence of sunlight at a window. At these locations, an expansion of the elements may take place. The restricted stiffness of the floor panels will provide for that the floor covering will bulge locally. The possible coupling means, such as a locking tongue and groove, show a limited strength only. The soft finishing layer is sensitive to scratches and stains, even if a superficial UV hardened lacquer layer is provided on top of the PVC finishing layer. Such superficial lacquer layer has a limited efficiency, as it can have been removed by walking thereon during the first years of use already.

WO 2013/026559 to a certain extent offers a solution to the problems with the dimensional stability of a substrate of soft PVC. By using a reinforcement layer soaked in PVC, more particularly a glass fiber mat having a weight of 65 grams per square meter, soaked in soft PVC, an improved interaction between the substrate and the glass fiber layer is obtained, as well as a limited improvement of the dimensional stability due to temperature variations.

In the case of WO 2014/006593, floor panels are concerned with a substrate of an extruded synthetic material composite with a veneer layer, for example, a vinyl top layer, as a decoration. The synthetic material composite may be obtained, for example, from, on the one hand, high-density polyethylene (HOPE), or PVC and, on the other hand, powder of bamboo, wood and/or cork. The substrate is stiff and offers a reduced risk of said telegraphy effects. Moreover, possible coupling parts may be provided in this stronger substrate. Such extruded substrates, however, tend to deform or warp, and the dimensional stability is of the same level as with the vinyl panels of the above-mentioned WO'559.

SUMMARY OF THE INVENTION

The present invention primarily aims at an alternative floor panel, wherein, corresponding to the preferred embodiments, a solution is offered to one or more problems with the floor panels of the state of the art.

To this aim, the invention, according to a first independent aspect thereof, relates to a floor panel having a substrate and a decoration provided thereon, with the characteristic that the substrate comprises at least a foamed layer of thermoplastic material and at least a reinforcement layer. The inventor has found that a foamed layer has a better dimensional stability than a non-foamed layer of the same thermoplastic material.

Moreover, with a foamed layer, a reinforcement layer has a more effective result for restricting possible dimensional expansions due to temperature variations.

It is noted that, within the scope of the present invention, by "substrate" reference is made to all portions of the floor panel situated underneath said decoration. By a foamed layer, a layer is intended which comprises hollow spaces, preferably in such an amount that the density of the material is reduced by at least 10% and preferably at least 25%. Preferably, this relates to so-called "closed cell" foam. By non-foamed layer a layer is meant without hollow spaces, or anyhow at most with an amount of hollow spaces such that the density is not or not more than 10% reduced, and preferably even not more than 2%.

In general, it is also noted that, within the scope of the invention, a foamed layer does not necessarily have to be foamed in a uniform manner. It is possible that the foamed layer, across its thickness, comprises a varying proportion of hollow spaces. So, for example, the highest proportion may be achieved centrally in the layer, whereas on one or more of the surfaces of such layer less foamed or even non-foamed zones may be present.

The respective foamed layer preferably is positioned centrally in the substrate or, in other words, forms at least a substrate portion present in the center of the thickness of the substrate.

The respective foamed layer preferably forms at least 30 percent of the thickness of said substrate. Preferably, it even forms 40 percent or more of the thickness of the substrate.

It is clear that it is not excluded that a plurality of foamed layers might be present in said substrate. The overall thickness of the foamed layers preferably is between 30 and 70 percent of the thickness of the floor panel, or between 25 and 65 percent of the thickness of the substrate.

Preferably, said foamed layer concerns a foamed polyvinyl chloride (PVC) layer. Preferably, this relates to so-called rigid PVC, namely PVC which is free from plasticizers or contains a content of plasticizers of 12 phr or less. Preferably, the content of plasticizers is between 1 and 6 phr. The stiffness of a layer of such hard foam is comparable to that of a non-foamed layer; however, due to its lower weight it offers ergonomic advantages during installation. It is evident that the invention is not limited to foamed layers of PVC, but is also applied in floor panels where the foamed layer is formed of another thermoplastic material, such as a phenol foam, polyurethane foam, polypropylene foam, polyethylene foam or polyethylene terephthalate foam.

Preferably, the foamed layer comprises filler materials, such as chalk or talc. The inventor has found that talk moreover results in an increased dimensional stability.

Preferably, at least 30 phr mineral fillers are applied in said foamed layer.

The foamed layer can be obtained in various possible manners, of which herein below the three most important possibilities are listed.

According to a first possibility, the foamed layer is obtained at least by means of a mechanical foaming process. Hereby is meant that in the respective layer hollow spaces are formed by pushing the thermoplastic material away by means of a foreign material.

This may relate, for example, to the use of expanding granules in a PVC-based layer.

More particularly, use can be made of the microspheres known from WO 2013/178561. It is evident that a floor panel, which is at least obtained according to this first possibility, will show the feature that the foamed layer contains hollow spaces, the walls of which are coated by means of the walls of the respective expanded granules.

According to a second possibility, the foamed layer is obtained at least by means of a chemical foaming process. By this is meant that in the respective layer hollow spaces are formed by means of a gaseous reaction product. For example, use can be made of azodicarbonamide. This material, when warming up, releases nitrogen gas which remains present in the foamed layer in the form of bubbles.

According to a third possibility, the foamed layer is obtained at least by means of fillers, wherein these fillers as such comprise one or more hollow spaces. Herein, for example, use can be made of the expanded condition of the already mentioned microspheres.

Preferably, the aforementioned reinforcement layer relates to a glass fiber layer, such as a woven or non-woven glass fiber layer. Preferably, such reinforcement layer or glass fiber layer has a weight of at least 30 g/m2, and preferably less than 100 g/m2. Better, the weight of the reinforcement layer of glass fiber layer concerns a weight between 35 and 65 grams per square meter, wherein 50 g/m2 is a good value.

The aforementioned reinforcement layer preferably is situated on one of the surfaces of the foamed layer. At that position, it may limit the risk of perforation or deformation of the respective surface of the foamed layer, and it results in an increased resistance against bulging of the respective surface. Preferably, the respective reinforcement layer is situated on the surface of the foamed layer directed towards the aforementioned decoration. In this manner, an increased resistance is obtained against indentation, for example, by chair or table legs.

According to the most preferred embodiment, said substrate further also encloses a second reinforcement layer. The two reinforcement layers preferably enclose at least a portion of said foamed layer and in this manner offer said effects of deformation resistance on both surfaces. Preferably, the two reinforcement layers are of the same kind, for example, both are glass fiber layers with a weight situated between 30 and 75 grams per square meter. Contrary to his expectations, the inventor has found that, in view of an improvement of the dimensional stability, it is more important to apply two reinforcement layers than choosing the weight or the strength of the separate reinforcement layers as high as possible. Thus, two reinforcement layers of a limited weight may be used, which is economically advantageous. So, for example, two glass fiber layers of 50 grams per square meter, or approximately 50 grams per square meter, may be used.

In general, it is also noted that in the case that more than one reinforcement layer is present in the floor panel, the overall weight of the present reinforcement layers preferably is less than 150 grams per square meter.

According to an important embodiment, said substrate preferably further also comprises at least a not yet foamed layer of a thermoplastic material. Such non-foamed layer preferably is situated at such a position in the substrate that it is entirely situated out of the center. As aforementioned, it is preferably the foamed layer that is positioned centrally in the substrate. The availability of a non-foamed layer in a floor panel, which further, according to the invention, comprises a foamed layer and a reinforcement layer, forms a barrier against telegraphy effects and, depending on the position of this non-foamed layer, may lead to various other advantages.

Preferably, the aforementioned non-foamed layer is adjacent to one of the surfaces of the aforementioned foamed layer and/or to the reinforcement layer possibly provided on that surface of the foamed layer. In case that the respective surface is directed towards said decoration, by means of said non-foamed layer additional resistance against indentation is obtained. In that the decoration in this manner is provided on a more stable underlying surface, the impact resistance of the floor panel as a whole is improved.

As aforementioned, the non-foamed layer preferably is positioned off the center of the substrate. In this manner, an increased bending stiffness of the substrate, and thus the entire floor panel, is obtained.

Preferably, the aforementioned non-foamed layer contains the same thermoplastic material as the aforementioned foamed layer or is based on the same thermoplastic material. Of course, it may have a different content of additives, such as plasticizers and/or fillers.

Preferably, said non-foamed layer is free from plasticizers of comprises a content of plasticizers which is smaller than 12 phr, and still better is smaller than 7 phr. Suitable plasticizers for polyvinylchloride concern, amongst others, DINP, DOTP and DINCH.

According to an important embodiment, the aforementioned substrate further also comprises at least a second non-foamed layer of thermoplastic material, wherein the respective non-foamed layers enclose at least a portion of said foamed layer. According to this embodiment, an interesting composition of the substrate is obtained, which is light-weight and still shows a high bending stiffness. Moreover, such composition results in a stable substrate or substrate portion. Preferably, said substrate further comprises at least a third non-foamed layer of thermoplastic material, wherein this third non-foamed layer is situated between the decoration and at least one of the aforementioned first and second non-foamed layers. Preferably, the third non-foamed layer is situated between the decoration and the whole of the foamed layer and the first and second non-foamed layers. The features of the aforementioned third non-foamed layer, and more particularly the softness or compressibility thereof, can be matched to the desired function of this third non-foamed layer. So, for example, it may comprise a content of plasticizer which is higher than the content of plasticizer which possibly is present in said first and/or second non-foamed layer. When such layer is situated at a position between the decoration and the whole of the foamed layer and the first and second non-foamed layers, it may effect a certain sound damping which increases walking comfort, and it offers advantages in terms of production technique. So, for example, indentations, which are provided on the surf ace of the floor panel, may continue up into this third non-foamed layer, whereby indentations can be obtained with a depth of more than 0.1 mm or even of 0.4 mm or more. In such case, the aforementioned third non-foamed layer preferably is situated directly underneath the aforementioned decoration, or at least at a distance of less than 0.15 mm underneath the decoration. With such indentations, said decoration itself also is brought out of the plane, such that very lively imitations of, for example, wood or stone surfaces can be obtained.

In general, said substrate preferably further also comprises at least another layer of thermoplastic material, wherein this thermoplastic material contains plasticizers with a content that is larger than the possible plasticizer content in said foamed layer.

Herein, this possibly may concern said third non-foamed layer. However, it is evident that such layer is also of interest when said first and/or second non-foamed layers are not present.

Moreover, the layer with the higher plasticizer content possibly may be foamed, however, not necessarily. Preferably, said layer with the higher plasticizer content is situated between said foamed layer and said decoration. In this manner, the advantages of sound damping and the advantages in terms of technical production, which are mentioned herein above in connection with the third non-foamed layer, can be achieved here as well. Preferably, said layer with the higher plasticizer content contains the same thermoplastic material as said foamed layer, namely preferably polyvinyl chloride (PVC). Preferably, said layer with the higher plasticizer content is not foamed.

According to a most preferred embodiment, the substrate comprises a foamed layer of a thermoplastic material, preferably of PVC with a plasticizer content of less than 12 phr or without plasticizer, wherein the substrate further also comprises one or more non-foamed layers on both surfaces of the foamed layer, also each time preferably of PVC with a plasticizer content of less than 12 phr, wherein the ratio of the thickness of all non-foamed layers on the one surface to the thickness of the non-foamed layers on the other surface of the foamed layer is between 0.6 and 1.70 or still better between 0.75 and 1.33. By making this whole of non-foamed layers underneath and above the foamed layer approximately equally thick, or at least with a comparable thickness within said ratio, a stable sandwich is created. Preferably, the whole of non-foamed layers at the lower surface is thinner than the whole of non-foamed layers at the upper surface of the foamed layer; however, within said ratio. In such case the average plasticizer content of the non-foamed layers at the upper surface preferably is higher than the average plasticizer content of the non-foamed layers at the lower surface. It is clear that according to the invention the substrate also encloses at least a reinforcement layer.

Preferably, at least two reinforcement layers are applied, namely preferably each time one per surface of the aforementioned foamed layer. These reinforcement layers then preferably each time form the separation between the foamed layer and the aforementioned whole of non-foamed layers.

Preferably, said decoration comprises a printed motif. Such printed motif can be provided on a thermoplastic foil, for example, a PVC foil. Within the scope of the present invention, such foil, in the present case, is seen as a component of the aforementioned decoration and thus not as a part of the substrate. Instead of using a foil, a print may be used, which is performed on the substrate, with the intermediary of primer layers, for example, obtained by means of white PVC plastisol, wherein these primer layers, in the scope of the present invention and in the present case, thus are also considered as forming part of said decoration.

Preferably, the printed motif concerns a pattern of wood nerves and/or stone.

Preferably, the floor panel shows the motif of just one wood plank.

Although printed motifs are preferred, it is not excluded that the decoration might be formed by, for example, veneer of real wood or veneer of real stone, or by a consolidated mixture of powders, for example, PVC powders or PVC granulates.

Preferably, the floor panel further also comprises a translucent or transparent wear layer which is provided above said decoration. Preferably, such wear layer substantially consists of thermoplastic material, preferably PVC, for example, with a thickness between 0.15 and 0.75 millimeter. However, such wear layer preferably also shows a superficial lacquer layer. Examples of suitable lacquer layers are lacquer layers based on urethane acrylates, polyester acrylates and/or epoxide acrylates. Preferably, this relates to lacquer layers which are cured by means of UV radiation or excimer radiation. The respective lacquer layer may comprise hard particles, for example, of aluminum oxide and/or silica in order to achieve an increased wear resistance.

It is noted that the embodiments of the present invention, wherein one or more layers with a low plasticizer content or without a plasticizer are situated between the reinforcement layer and the decoration, offer particular advantages in respect to the choice of the lacquer layer. To wit, it may be chosen for a more efficient lacquer layer, whereas the risk of undesired side effects remains limited. To wit, more effective lacquer layers will show a certain shrinkage and as a result may lead to raised edges in the case that soft substrates are applied. The presence of the layers without plasticizer or with a limited content of plasticizer, for example, less than 12 phr or less than 7 phr close to the surface of the floor panel, limits this risk. A good choice for an efficient lacquer is a lacquer based on urethane acrylate, with a content of hard particles, such as aluminum oxide and/or silica, of more than 15 percent by weight, or even of 25 percent by weight or more. The lacquer layer may be made thicker than usual, for example, with a thickness larger than 20 micrometers, such that it will longer stay effective. A larger thickness of the lacquer layer also allows applying coarser hard particles, which then is advantageous in respect to wear resistance. Preferably, hard particles are applied having an average particle size of more than 10 micrometer.

Preferably, the floor panel, and preferably the substrate, viewed in thickness, comprises at least 2 millimeters of thermoplastic material that is free from plasticizers or shows a plasticizer content of less than 12 phr or still better of less than 7 phr. The inventor has found that this amount of hard thermoplastic material is sufficient to exclude the most important telegraphy effects. It is clear that, according to the invention, this thickness can be formed by foamed or non-foamed layers.

Preferably, the floor panel, viewed in thickness, comprises maximum 5 or still better maximum 3 millimeters of foamed thermoplastic material. Preferably, the foamed layer of the invention shows a thickness of maximum 4 millimeters, wherein said foamed layer then, as aforementioned, preferably is present centrally in the substrate.

Preferably, said substrate consists, for at least 40 percent of its thickness, of said foamed layer, wherein the remaining substrate material preferably is unfoamed. As an alternative, the substrate, close to its lower surface, may also show an additional foamed layer, such independent from the thickness of the first foamed layer, which preferably, as aforementioned, is positioned centrally in the substrate. Said additional foamed layer preferably also comprises thermoplastic material. Although it is not excluded that it consists of the same thermoplastic material as the foamed layer, it is preferably, independent from the material of the foamed layer, based on polyethylene. This may relate, for example, to a layer of cross-linked or interconnected polyethylene (XPE) having a thickness of 0.7 to 3 mm.

The various substrate layers can be realized in many different manners and can be attached on top of each other by means of a thermal laminating process. In the case that the substrate shows an additional foamed layer at its underside, this layer preferably is attached to the remaining substrate portions by means of a glue connection.

Preferably, one or more of the thermoplastic layers of the substrate are obtained by means of strewing and consolidating at least the aforementioned thermoplastic material, whether or not in granulate form. Strewing treatments for manufacturing floor panels are known as such, for example, from WO 2013/179261.

The floor panels of the invention preferably can be applied for realizing a floating floor covering. To this aim, they may be provided with profiles on one or more edges. The layer composition of the floor panels of the invention may show various synergetic effects with the actual form of such profiles. Below, a number of preferred characteristics of such profiles will be listed.

Preferably, the floor panel of the invention shows the characteristic that, on at least two opposite edges, it is provided with coupling means which allow coupling two such floor panels together, wherein at the respective edges a locking is effected at least in a vertical direction perpendicular to the plane of the panels, wherein at least one of the aforementioned edges is provided with a groove, the deepest point of which is situated in said foamed layer. Realizing the groove at least partially in the foamed material offers advantages in respect to dimensional stability. Preferably, said reinforcement layer extends uninterruptedly in one of the lips which border the aforementioned groove. In the case that the substrate shows two reinforcement layers, those preferably each extend in at least a portion of one of these lips, namely one in the upper groove lip and one in the lower groove lip. Preferably, the reinforcement layers are at least uninterrupted up to the groove opening, namely there, where the distal end of the shortest of the respective lips is situated. According to this last possibility, a very stable vertical locking is obtained between the floor panels, and the risk of raised edges on the surface of the floor panels is minimized. It is clear that the respective groove preferably cooperates with a tongue on an opposite edge of a similar floor panel or with a separate connection piece which also cooperates with an opposite edge of a similar floor panel.

In both cases in a coupled condition of two of such floor panels preferably one or more pairs of vertically active locking surfaces are created. Preferably, at least one such pair is situated in the aforementioned groove, namely on one or both groove lips, wherein said reinforcement layer or reinforcement layers then preferably extend uninterruptedly up to underneath the respective pair of vertically active locking surfaces. Preferably, at least one of said pairs, and still better both pairs of vertically active locking surfaces are formed on the material of the aforementioned foamed layer. Use can be made of a certain tension on the respective contact surfaces, by which a very stable connection is obtained. Such tension may be realized, for example, by providing an excess of material at the location of these contact surfaces. By a good choice for the position of the reinforcement layer or layers and the possible non-foamed layers, it may be prevented that the possible tension propagates towards the surface of the floor panel.

Preferably, the floor panel of the invention shows the characteristic that, on at least two opposite edges, it is provided with coupling means which allow coupling two of such floor panels to each other, wherein at the respective edges a locking is effected at least in a horizontal direction in the plane of the panels and perpendicular to the edges, wherein at least one of the aforementioned edges is provided with an upward-directed hook-shaped locking part, wherein said locking part extends at least partially in a portion of the substrate which is free from said foamed layer. By means of this characteristic, a well-defined horizontal locking is obtained. To wit, non-foamed layers can be treated with higher precision.

Preferably, the floor panel of the invention shows the characteristic that, on at least two opposite edges, it is provided with coupling means which allow coupling two of such floor panels to each other, wherein at the respective edges a locking is effected at least in a vertical direction perpendicular to the plane of the panels, wherein at least one of the aforementioned edges is provided with a groove, wherein this groove is bordered by an upper lip and a lower lip, and wherein the upper surface of the lower lip is at least partially formed in said foamed layer. It is advantageous to provide the lower lip in this material, as it, as mentioned above, shows a good dimensional stability. This characteristic leads to an improved mechanical coupling, wherein the risk of gap formation between the coupled edges is restricted. Of course, it is not excluded that the aforementioned upper surface of the lower lip also is at least partially formed in a portion of the substrate that is free from said foamed layer, for example, a portion of the upper surface which participates in a possible locking in horizontal direction.

Preferably, the floor panel of the invention shows the characteristic that, on at least two opposite edges, it is provided with coupling means which allow coupling two of such floor panels to each other, wherein at the respective edges a locking is effected at least in a vertical direction perpendicular to the plane of the panels, wherein at least one of the aforementioned edges is provided with a groove, wherein this groove is bordered by an upper lip and a lower lip and wherein the lower surface of the upper lip is at least partially formed in said foamed layer.

Preferably, the floor panel of the invention shows the characteristic that, on at least two opposite edges, it is provided with coupling means which allow coupling two of such floor panels to each other, wherein at the respective edges a locking is effected at least in a vertical direction perpendicular to the plane of the panels, wherein at least one of the aforementioned edges is provided with a groove, wherein this groove is bordered by an upper lip and a lower lip and wherein the lower surface of the upper lip is at least partially formed in a portion of the substrate that is free from said foamed layer.

Preferably, the floor panel of the invention shows the characteristic that, on at least two opposite edges, it is provided with coupling means which allow coupling two of such floor panels to each other, wherein at the respective edges a locking is effected at least in a vertical direction perpendicular to the plane of the panels, as well as in a horizontal direction in the plane of the floor panels and perpendicular to the respective edges, wherein said locking in vertical direction is provided by at least a pair of cooperating contact surfaces formed in said foamed layer, whereas said locking in horizontal direction is provided by at least a pair of cooperating contact surfaces formed by a portion of the substrate that is free from said foamed layer.

Preferably, the floor panel of the invention shows the characteristic that, on at least two opposite edges, it is provided with coupling means which allow coupling two of such floor panels to each other, wherein at the respective edges a locking is effected at least in a vertical direction perpendicular to the plane of the panels, as well as in a horizontal direction in the plane of the floor panels and perpendicular to the respective edges, wherein said locking in vertical direction is provided by two pairs of cooperating contact surfaces, wherein a first pair is formed in said foamed layer, whereas a second pair is formed by a portion of the substrate that is free from said foamed layer.

Preferably, the floor panel of the invention shows the characteristic that, on at least two opposite edges, it is provided with coupling means which allow coupling two of such floor panels to each other, wherein at the respective edges a locking is effected at least in a vertical direction perpendicular to the plane of the panels, wherein at least one of the aforementioned edges is provided with a groove, wherein this groove is bordered by an upper lip and a lower lip and wherein said reinforcement layer extends in said upper lip.

In general, it is clear that the invention preferably is applied with floor panels which, on at least one pair of edges, are provided with mechanical coupling means allowing to couple two of such floor panels to each other, in such a manner that a locking is created in a vertical direction perpendicular to the plane of the coupled panels, as well as in a horizontal direction perpendicular to the coupled edge and in the plane of the panels.

Preferably, the coupling means also show one or a combination of two or more of the following features:
  the feature that the mechanical coupling means or coupling parts substantially are realized as a tongue and a groove bordered by an upper lip and a lower lip, wherein this tongue and groove substantially are responsible for the locking in said vertical direction, and wherein the tongue and the groove are provided with additional locking parts, substantially responsible for the locking in said horizontal direction. Preferably, the locking parts comprise a locking groove on the lower side of the edge with the tongue, and a hook-shaped part provided on the lower groove lip. Such coupling means and locking parts are known, for example, from WO 97/47834;
  the feature that the mechanical coupling means or coupling parts press the coupled floor panels against each other, for example, in that these mechanical coupling means are realized with a so-called pretension, as is known as such from EP 1 026 341. The tensioning force with which the floor panels are pressed against each other or towards each other may be obtained, for example, in combination with the above-mentioned feature, by means of a lower lip which is bent out in coupled position, which, in an attempt to spring back, presses against the lower side of the tongue; the feature that the mechanical coupling means allow a coupling by means of a horizontal, or quasi horizontal, shifting movement of the panels towards each other;
  the feature that the mechanical coupling means allow a coupling by means of a turning movement W along the respective edges;
  the feature that the mechanical coupling means allow a coupling by means of a downward-directed movement of a male coupling part, for example, with a tongue, into a female coupling part, for example, with a groove;
  the feature that the mechanical coupling means, or at least the pertaining upper edge, is realized by means of a milling treatment with rotating milling tools.

Preferably, the substrate of the floor panel of the invention has a thickness of 4 to 8 millimeters.

With the same aim as in the first aspect, the invention, according to an independent second aspect thereof, relates to a method for manufacturing a floor panel, wherein this floor panel comprises at least a substrate and a provided thereon decoration, wherein the method for forming the substrate comprises at least the following steps:
  the step of providing a prefabricated sheet, preferably a glass fiber layer;
  the step of providing thermoplastic material; the step of foaming said thermoplastic material for forming a foamed substrate or substrate portion, wherein the foaming takes place in the presence of said prefabricated sheet.

As the foaming takes place in the presence of said prefabricated sheet, various advantageous effects can be achieved according to the nature of the prefabricated sheet and its position in respect to the foaming material.

Preferably, said step of providing thermoplastic material comprises at least a strewing treatment. Preferably, the strewing treatment is performed with a so-called dry-blend, rather than with granulates.

For foaming, use can be made of the also above-mentioned mechanical foaming as well as of chemical foaming.

Preferably, the step of foaming is performed between the pressing belts of a continuous press. In this manner, the thickness of the obtained substrate or substrate portion can be kept under control to a certain extent.

Preferably, during the step of foaming also a consolidation is performed of the material of the respective layer, and/or the prefabricated sheet is connected to the respective substrate or substrate portion.

Preferably, at least the foaming and consolidating is performed in the same press treatment.

As aforementioned, the prefabricated sheet preferably relates to a glass fiber layer. Herein, this may relate to a woven or non-woven. Preferably, the reinforcement layer or glass fiber layer has a weight of at least 30 grams per square meter, however, preferably less than 100 grams per square meter.

In the method of the second aspect, the prefabricated sheet may perform various possible functions, some of which are listed up below, without striving to be exhaustive.

According to a first possibility, said prefabricated sheet forms a carrier for the respective thermoplastic material and/or for the thermoplastic material of another substrate portion. In this manner, the prefabricated sheet allows for a simple production, which possibly may be performed in a continuous manner.

According to a second possibility, said prefabricated sheet forms a separation between said thermoplastic material of the foamed layer and a further layer of thermoplastic material. This embodiment is of particular importance when one or more of these layers are provided by means of a strewing treatment or in liquid phase. The prefabricated sheet at least to a certain extent prevents the mixing of the material of the layers it is separating. This is relevant for reliably setting the thickness of the substrate portions above and underneath the respective prefabricated sheet, and for maintaining the possibly different compositions of the respective substrate portions. Preferably, the foamed layer as well as said further layer initially is provided as a strewn thermoplastic material and are they consolidated together in the presence of the prefabricated sheet. As aforementioned, the composition of the thermoplastic material of said further layer can differ from the composition of said foamed layer.

According to a third possibility, said prefabricated sheet relates to a reinforcement layer, which is in particular the case with a glass fiber layer.

According to a particular embodiment of the method of the invention, said prefabricated sheet is connected under tension to said thermoplastic material. As the sheet is under tension, various advantageous effects can be achieved in the production. So, for example, during foaming, consolidating and/or connecting at least a shrinkage may arise in said foamed layer. Such shrinkage results in a compression of the prefabricated sheet, such that this sheet, with a possible expansion of the substrate due to temperature variations, only becomes active when the compression has been withdrawn again. Thus, the prefabricated sheet becomes active with a delay only and not during the first expansion. By applying, according to the present particular embodiment, a tension, the prefabricated sheet already can become active with a much smaller expansion of the substrate. Preferably, said tension in the prefabricated sheet leads to an expansion in this sheet which is at least 20% of the aforementioned shrinkage. In this manner, it is guaranteed that the prefabricated sheet is already active as a stabilizer in the obtained substrate or substrate portion with the occurrence of expansion values which are 80% of said shrinkage. The higher the tension in the sheet during production, the sooner the prefabricated sheet, preferably a glass fiber layer, can become active.

Preferably, the method further also comprises the step of providing at least another substrate layer of thermoplastic material, wherein this thermoplastic material comprises plasticizers with a content higher than the possible content of plasticizer in said foamed layer. Preferably, the respective substrate layer is provided in liquid form on the aforementioned, already formed substrate portion with the foamed layer.

Preferably, the method of the second aspect further also comprises the step of providing a decoration on said substrate or substrate portion. Such decoration may comprise, for example, a printed foil.

It is clear that the method of the second aspect can be excellently used for manufacturing the floor panels of the first aspect and the preferred embodiments thereof. Thus, further it is also clear that the composition of the various substrate portions of the first aspect can correspond to the composition of the thermoplastic material of the second aspect.

BRIEF DESCRIPTION OF THE DRAWINGS

With the intention of better showing the characteristics of the invention, herein below, as an example without any limitative character, some preferred embodiments are described, with reference to the accompanying drawings, wherein:

FIGS. 4 to 10, in a similar view, represent variants;

FIG. 11, at a larger scale, represents a cross-section according to the line XIXI indicated in FIG. 1;

FIGS. 12 to 14, in a similar view, represent variants; and

FIG. 15 schematically represents some steps in a method according to the invention.

DETAILED DESCRIPTION OF THE INVENTION

Figure 1:
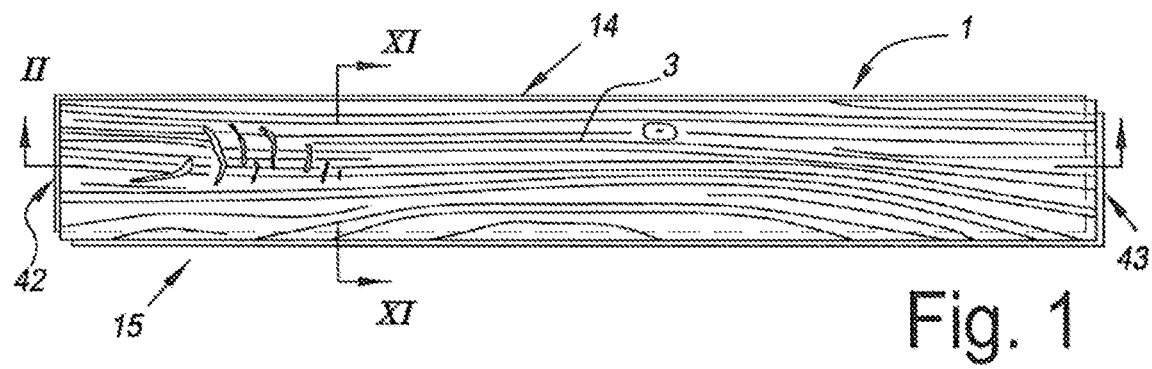
FIG. 1 represents a floor panel having the characteristics of the invention.

FIG. 1 represents a rectangular floor panel 1.

Figure 2:
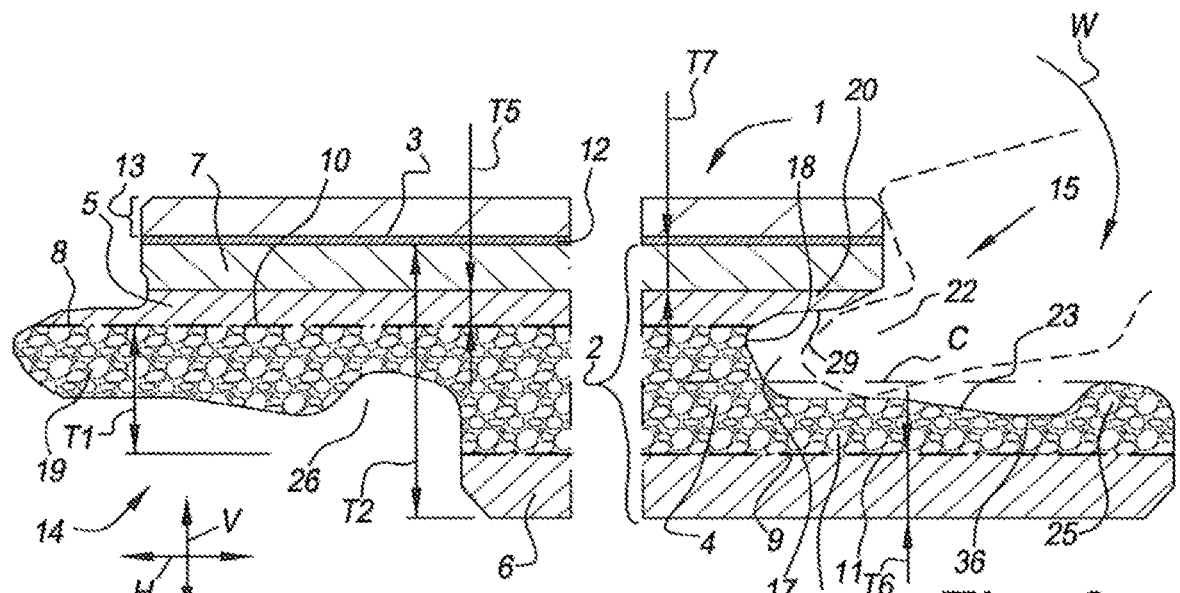
FIG. 2, at a larger scale, represents a cross-section according to the line 11-11 indicated in FIG. 1.

FIG. 2 clearly shows that the floor panel 1 comprises a substrate 2 and a decoration 3 provided thereon.

The substrate 2 comprises a foamed layer 4 of thermoplastic material, in this case polyvinyl chloride (PVC). This foamed layer 4 is positioned such that it is at least centrally present in the substrate 2, namely on the central line C. In this case, the thickness T1 of the foamed layer forms more than 40 percent of the thickness T2 of the substrate. For the rest, the substrate 2 in this case only comprises not yet foamed layers 5-6-7.

The substrate 2 of the floor panel 1 from the example of FIGS. 1 and 2 comprises a first and a second reinforcement layer 8-9, in this case glass fiber layers, more particularly glass fiber mats (nonwoven). A first reinforcement layer 8 is situated on the surface 10, which is directed towards the decoration 3, of the foamed layer 4 and, together with the second reinforcement layer 9, it encloses the foamed layer 4. Said second reinforcement layer 9 herein is situated on the opposite surf ace 11 of the foamed layer 4.

Said decoration 3 comprises a printed motif and represents a single wooden plank. The printed motif is provided on a thermoplastic foil 12, namely a PVC foil. Further, the floor panel 1 comprises a transparent or translucent wear layer 13, which is provided above said decoration 3.

In the example, said non-foamed layers 5-6-7 comprise a first non-foamed layer 5 and a second non-foamed layer 6, which respectively are adjacent to said surfaces 10-11 of the foamed layer 4, and, in this case, also to the reinforcement layers 8-9 present there. These first and second non-foamed layers 5-6 consist of the same thermoplastic material, namely PVC, as the foamed layer 4, however, preferably contain a higher content of fillers, such as chalk or talc. The floor panel of FIG. 2 forms an example of a substrate 2 where the respective non-foamed layers 5-6 enclose the foamed layer 4.

The substrate 2 of FIG. 2 further also comprises a third non-foamed layer 7 of thermoplastic material. This third non-foamed layer 7 is situated between the decoration 3 and said first non-foamed layer 5 and contains a content of plasticizer which is higher than the plasticizer content possibly present in the foamed layer 4 and/or is higher than the plasticizer content possibly present in the first and/or second non-foamed layer 5-6.

Preferably, the non-foamed layer 6 on the lower surface 11 of the foamed layer 4, namely the second non-foamed layer 6, is made thicker than said first foamed layer 5 on the upper surface 10 of the foamed layer 4, for example, with a thickness T6 which is larger than 1.5 times the thickness T5 of the first non-foamed layer 5. Preferably, the sum of the thickness T5 of the first non-foamed layer 5 and the thickness T7 of the third non-foamed layer 7 is approximately equal to, equal to or larger than the thickness T6 of the second non-foamed layer 6, preferably at least 10 percent larger, however, less than 50 percent larger. In this manner, the second foamed layer 6 can counteract possibly remaining tensions in the first and third foamed layers 5-7 in an optimum manner.

The substrate 2 of the floor panel 1 of FIG. 4 forms an example of the most preferred embodiment mentioned in the introduction, wherein the substrate 2 comprises a foamed layer 4 of thermoplastic material, preferably of PVC with a plasticizer content lower than 12 phr or without plasticizer, and wherein the substrate 2 further also shows one or more non-foamed layers 5-6-7 on both surfaces 10-11 of the foamed layer 4, which non-foamed layers respectively also being preferably of PVC with a plasticizer content of less than 12 phr. The ratio of the overall thickness of all non-foamed layers 6 on the one surface 11 to the thickness of the non-foamed layers 5-7 on the other surface 10 of the foamed layer 4 is between 0.75 and 1.33, namely, in this case approximately 0.8. The whole of non-foamed layers 6 in this case is thinner on the lower surface 11 than the whole of non-foamed layers 5-7 on the upper surface 10 of the foamed layer 4; however, within said ratio. The average plasticizer content of the non-foamed layers 5-7 on the upper surface 10 is higher than the average plasticizer content of the non-foamed layers 6 on the lower surface 11, as the aforementioned third non-foamed layer 7 contains a higher plasticizer content than the possible plasticizer content in the first and second non-foamed layer 5-6. In the example, said reinforcement layers 8, 9 respectively form the separation between the foamed layer 4 and said whole of non-foamed layers.

Figure 3:
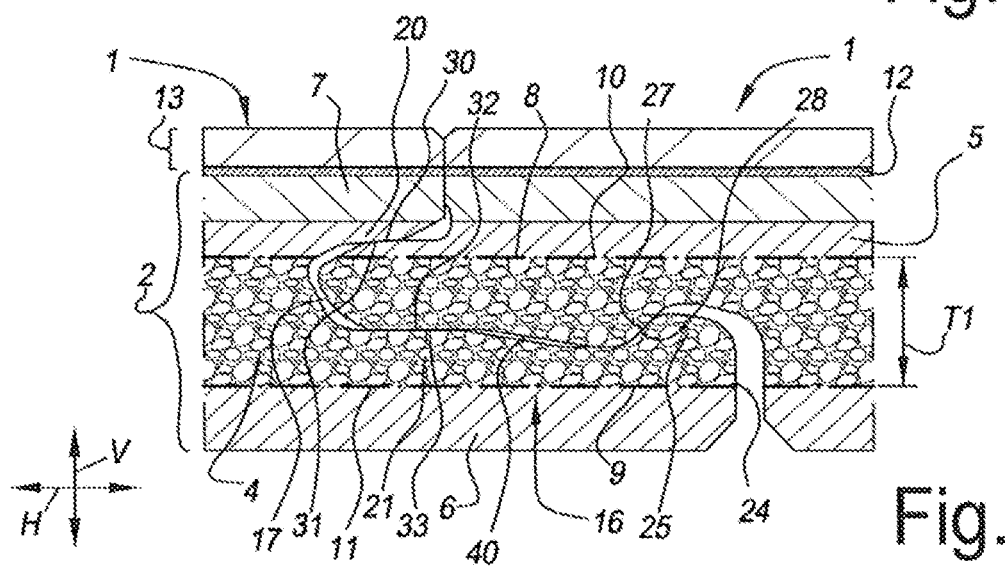
FIG. 3, at the same scale, represents the coupled condition of two of such floor panels.

The floor panel 1 from the example is, at least on the two opposite long edges 14-15, provided with coupling means 16 allowing to couple two of such floor panels 1 to each other, wherein, as represented in FIG. 3, a locking is effected at the respective edges 14-15 in a vertical direction V perpendicular to the plane of the panels 1, as well as in a horizontal direction H perpendicular to the respective edges and in the plane of the panels 1. To this aim, the panel 1, on at least one of its long edges 15, is provided with a groove 17, wherein the deepest point 18 of this groove 17 is situated in said foamed layer 4. In this case, the groove 17 is provided for cooperation with a tongue 19 on the opposite edge 14 and is bordered by an upper lip 20 and a lower lip 21, wherein the lower lip 21, in distal direction, extends to beyond the upper lip 20, or, in other words, beyond the groove opening 22. FIG. 2 represents that the tongue 19 can be inserted into the groove 18 by means of a turning movement W around the respective edges 14-15.

In this case, the upper surface 23 of the lower lip 21 is entirely formed of the material of said foamed layer 4, and the lower lip 21, in the proximity of its distal end 24, is provided with a hook-shaped locking part 25, which in this case also consists of material of the foamed layer 4. The hook-shaped part 25 is intended for, in coupled condition, cooperating with a locking groove 26 on the lower side of the edge 14 which is provided with said tongue 19, and effects said locking in horizontal direction H. To this aim, a pair of horizontally active contact surfaces 27-28 is formed between said hook-shaped part 25 and the locking groove 26. The contact surfaces 27-28 are formed on the material of the foamed layer 4.

In the example, the lower surface 29 of the upper lip 20 is practically completely formed in a portion of the substrate 2 which is free from said foamed layer 4. In coupled condition, a first pair of vertically active contact surfaces 30-31 is formed on this portion which is free from the material of the foamed layer 4. A second pair of vertically active contact surfaces 32-33 is formed on the upper surface 23 of the lower lip 21 and on the material of the foamed layer 4. In this case, the second pair of vertically active contact surfaces 32-33 is at least partially situated underneath the upper lip 20, namely, in the actual groove 17, thus, proximally in respect to the groove opening 22.

One of the reinforcement layers 9 extends uninterruptedly in said lower lip 21, whereas the second of said reinforcement layers 8 extends in the material of said tongue 19. In this manner, material portions which protrude from the edges 14-15 will be additionally supported. Herein, also the presence of a portion of a non-foamed layer 5-6-7 in the tongue 19 as well as in the lower lip 21 is advantageous. The stability of the upper lip 20 is guaranteed by the non-foamed layers 5-7 present there.

The foamed layer 4, as well as the first and second non-foamed layers 5-6, are free from plasticizer or contain a plasticizer content of less than 12 phr. The third non-foamed layer 7, too, contains a plasticizer content of less than 12 phr. Thus, the substrate 2 consists entirely of layers 4-5-6-7 having a plasticizer content of less than 12 phr, if plasticizer were present at all in the respective layers 4-5-6.

The layers of the substrate 2 represented here are attached to each other by means of a thermal laminating process. The foamed layer 4 and the first and second non-foamed layers 5-6 are obtained by means of strewing and consolidating thermoplastic material, whether or not in the form of granulate or so-called dry-blend.

FIG. 4 represents an example of a floor panel 1 according to the invention, which shows the same layer composition as the floor panel 1 of the FIGS. 1 to 3, with the exception of an additional foam layer 34 on the lower side of the substrate. Here, this relates to a foam layer 34 of cross-linked or interconnected polyethylene (XPE), which by means of glue is attached to the remaining substrate portions, in particular to the non-foamed layer 6. In this case, this relates to a soft foam.

FIG. 4 further clearly shows that in this case the lower surface 29 of the upper lip 20 is formed entirely from the foamed layer 4, including the pair of vertically active contact surfaces 30-31 present there. In coupled condition, in this example, a space 35 is present on the lower side of the tongue 19, which space extends at least from the tip of the tongue 19 to beyond the upper lip 20. The reinforcement layers 8, 9 are situated in the upper lip 20 as well as in the lower lip 21 and extend uninterruptedly in these.

In the case of FIG. 3 as well as FIG. 4, the locking groove 26 extends up into the upper half of the substrate, namely up to above the level C. Preferably, the substrate 2 comprises at least one reinforcement layer 8, which, as is the case here, extends uninterruptedly above said locking groove 26, whereas the possible other one of the reinforcement layers 9, at least at the location of said locking groove 26, is omitted or is removed.

Figure 5:
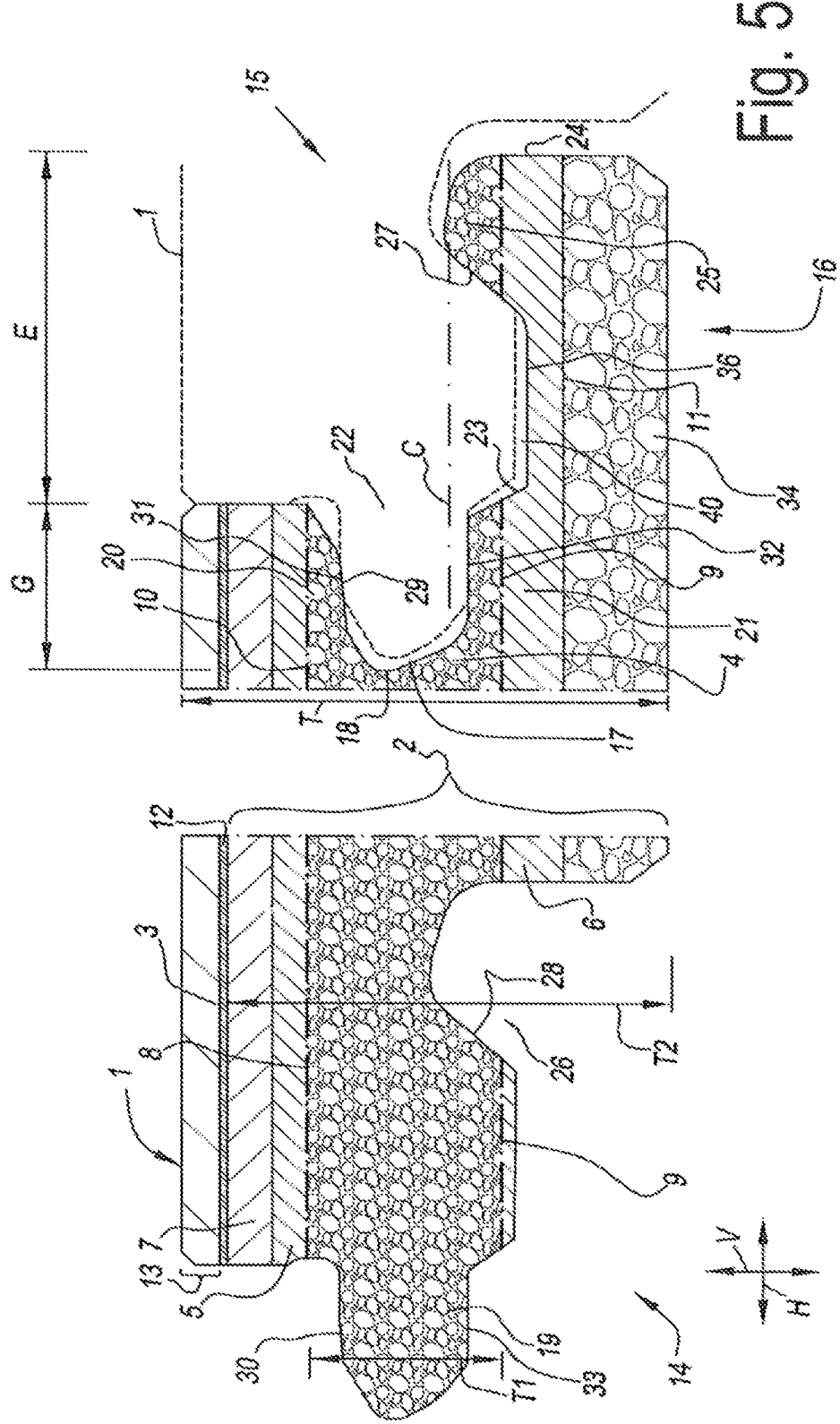

FIG. 5 represents an example with similar substrate portions as FIG. 4. However, the edge profile is different. The upper surface 23 of the lower lip 21 is formed partially in the material of the foamed layer 4, as well as in the material of the underlying non-foamed layer 6. Herein, the reinforcement layer 9 on the lower surface 11 of the foamed layer 4 is interrupted at the location of the deepest zone 36 in said upper surface 23.

Preferably, as represented here, at the location of this deepest zone 36 at least half of the thickness of the whole of non-foamed layers 6 remains conserved at the lower surface 11. The horizontally active contact surfaces 27-28 for the major part are formed on the material of the foamed layer 4, however, for a part are also formed on the material of the underlying non-foamed layer 6. The reinforcement layer 9 is interrupted in said lower lip 21, however, intersects the aforementioned horizontally active contact surfaces 27-28.

In the example of FIG. 5, the lower surface 29 of the upper lip 20 is formed practically entirely in the foamed portion 4 of the substrate 2. In coupled condition, a first pair of vertically active contact surfaces 30-31 is formed on this portion. A second pair of vertically active contact surfaces 32-33 is formed on the upper surface 23 of the lower lip 20, also on the material of the foamed layer 4. In this case, the second pair of vertically active contact surfaces 32-33 is situated at least partially, and here even entirely, underneath the upper lip 21, namely, in the actual groove 17, or, in other words, proximally in respect to the groove opening 22.

FIG. 6 for the substrate 2 shows a similar layer construction as the FIGS. 4 and 5.

Above the decoration 3 in this case a wear layer 13 is applied, which also comprises a superficial lacquer layer 37. Possibly remaining tensions in the respective lacquer layer 37 hardly have any effect on the upper lip 21, as this shows portions of non-foamed layers 5-7, which are free from plasticizers or have a plasticizer content of less than 12 phr or still better of less than 7 phr. Moreover, a reinforcement layers 8 extends uninterruptedly in this upper lip 20.

It is evident that a superficial lacquer layer 37 may form part of the wear layer 13 of any embodiment of floor panels 1 according to the present invention.

In the case of FIG. 6, the edge profile comprises coupling means 16 with, at the tongue side 14, a convex lower side, and a cooperating therewith concave upper surface 23 of the lower lip 20 at the groove side 15. At the location of the horizontally active contact surfaces 27-28, an overlap 38 is provided in the contour of the coupling means 16, such that in the coupled condition a tension is created at least on these horizontally active contact surfaces 27-28. With the vertically active contact surfaces 30-31 on the upper side of the tongue 19 and the lower side of the upper lip 20, a tension may be created as well, either by a local overlap in the contour at that position, or that said overlap 38 at the location of the horizontally active contact surfaces 27-28 creates a tension which has an effect on the vertically active contact surfaces 30-31. This latter preferably is achieved by somewhat inclining the vertically active contact surfaces 30-31, as it is the case here. Preferably, these vertically active contact surfaces 30-31, in such case and globally seen, enclose an angle A in the range of 2° to 15°.

It is clear that such inclination of the first pair of vertically active contact surfaces 30-31 can be applied in any floor panel 1 with the characteristics of the invention, independently from the fact whether or not an overlap 38 is applied in the contour of the coupling means 16. FIGS. 1 to 9 moreover all form examples of the application of a slighter inclination, namely of less than 10°. In the example of FIG. 10, a stronger inclination than 10' is applied, however, still less than 45°, namely in the example approximately 30°.

Further, it is clear that an overlap 38 at the location of the horizontally active contact surfaces 27-28 can also be applied in any floor panel 1 with the characteristics of the invention.

FIG. 7 represents an example wherein the substrate 2 is constructed similarly as in FIG. 6, however, with the exception of the additional foamed layer 34 on the lower side of the substrate 2. While in FIG. 6 the vertically active contact surfaces 30-31 and the horizontally active contact surfaces 27-28 are formed on the material of the foamed layer 4, in the case of FIG. 7 the vertically active contact surfaces 30-31 are formed on a non-foamed layer 5 present on the upper surface 10 of the foamed layer 4. While in FIG. 6 the reinforcement layer 9 in the lower lip 21 is interrupted, it extends uninterruptedly in the lower lip 21 of the embodiment of FIG. 7. The overlap 38 of the contours, realized on the hook-shaped part 25 in FIG. 7, is more limited than in the case of FIG. 6.

FIG. 8 represents an example with approximately the same substrate portions as the example of FIG. 2, however, wherein the third foamed layer 7 mentioned there is omitted. The edge profiles show the same shape as those of FIG. 4, however, here they are realized such that the upper surface of the upper lip 20 for the major part is formed in the non-foamed layer 6 present on the lower surface 11 of the foam layer 4.

The horizontally active contact surfaces 27-28 on the hook-shaped part 25 are formed in the material of said foam layer 4, as well as in the material of the underlying non-foamed layer 6. The reinforcement layer 9 is interrupted in said lower lip 21, however, intersects said horizontally active contact surfaces 27-28, in this case, approximately in the middle. Preferably, as represented here, at the location of the deepest zone 36 in the upper surface of the lower lip 21, at least half of the thickness of the whole of non-foamed layers 6 is maintained on the lower surface 11 of the foamed layer 4.

FIG. 9 shows an example wherein the substrate 2 comprises a foamed layer 4 with a reinforcement layer 8 situated on the upper surface 10 of the foamed layer 4, and wherein the substrate 2 further also comprises a not yet foamed layer 7A on said upper surface 10. In this case, the applied non-foamed layer 7A shows the composition of the third non-foamed layer 7 mentioned within the scope of the preceding examples, namely a plasticizer content of more than the possible plasticizer content in the foamed layer 4.

In this case, the foamed layer 4 is obtained by means of consolidating and foaming strewn powders of thermoplastic material, whereas the non-foamed layer 7A is obtained by liquid application or calendering of thermoplastic material onto the already formed foamed layer 4. The substrate 2 comprises only one reinforcement layer 8, namely on the upper surface 10 of said foamed layer 4.

For the major part thereof, the edge profiles represented in the example of FIG. 9 are formed in the foamed layer 4. In this example, in coupled condition a space 35 is present on the lower side of the tongue 19, which space extends at least from the tip of the tongue 19 to beyond the upper lip 20. The reinforcement layer 8 is situated in the upper lip 20. On the upper surface 23 of the lower lip 20, however, more distally than the upper lip 21, namely beyond the groove opening, vertically active contact surfaces 32-33 are situated. In this case, even the upper surface of the hook-shaped part 25 forms a vertically active contact surface 39. This latter is not necessarily so.

FIG. 10 represents another embodiment wherein a similar construction of the substrate 2 is applied as in FIG. 9, however, wherein the, in this case single, reinforcement layer 8 is embedded in the foamed layer 4, in this case centrally or approximately central, in the foamed layer 4.

In the edge profiles of FIG. 10, a pair of vertically active contact surfaces 30-31 on the lower side 29 of the upper lip 20 partially is formed on said foamed layer 4 and partially on said non-foamed layer 6. In coupled condition, in this example, a space 35A is present on the lower side of the tongue 19, which space extends from the tip of the tongue 19 up to a position underneath the upper lip 21. On the upper surface 23 of the lower lip 21, a pair of vertically active contact surfaces 32-33 is formed, which extends from in the actual groove 17 to beyond the upper lip 20. Between this pair of vertically active contact surfaces 32-33 and the horizontally active contact surfaces 27-28 formed on the hook-shaped part 25, a space 40 is provided.

FIG. 10 further also shows that deep embossments 41 can be formed on the surface of the floor panel 1. In this case, this relates at least to embossments 41 with a depth D of approximately 0.4 mm for forming a chamfer. FIG. 10 clearly shows that the non-foamed layer 7A receives a portion of the embossment 41, as in this case a non-foamed layer 7A has been chosen for, with a higher plasticizer content than the foamed layer 4.

The decoration 3 which is present follows the embossment 41.

In connection with the contour overlaps 38 represented in FIGS. 6 and 7, it is noted again that similar contour overlaps of course are possible in all embodiments. In the coupled condition of two of such floor panels, such contour overlaps 38 may lead to the presence of a bent-out lower lip 21, as mentioned in the introduction, or to a material compression at least at the location of the horizontally active contact surfaces 27-28.

In all examples, the depth G of the groove 17 is less than the thickness T1 of the foamed layer 4. Such profile is preferred in view of stability of the coupling and, in particular, of the upper lip 20, however, it is not indispensable. This is of particular importance when use is made of a superficial lacquer layer 37 as a part of the wear layer 13.

As already mentioned, in all examples the vertically active contact surfaces 30-31 on the upper side of the tongue 19 and the lower surface 29 of the upper lip are made inclined. In the case of FIGS. 1 to 9, rather limited, namely with an angle between 2° and 15°, or even between 2 and 7° in the cases of the FIGS. 1 to 8. In the case of FIG. 10, an inclination is applied which is larger than 15°, namely in this case approximately 30°.

In all examples, the lower lip 21 of the groove 17 protrudes to beyond the upper lip 20 over a distance E which is at least two times the thickness T1 of the foamed layer A. Although the lower lip 21 does not necessarily has to protrude, and also coupling means 16 can be applied with a shorter or equally long lower lip, such as, for example, the coupling means of WO 97/47834 or WO 01/98603, a protruding lower lip 21 is preferred. The extent of protrusion of the lower lip, or the distance E, preferably is at least one time the thickness T1 of the foamed layer 4. The extent of protrusion preferably is less than one and a half time the overall thickness T of the floor panel 1, and preferably is more than half of the thickness T of the floor panel 1, as it here is the case in all examples. Although in the figures each time a chamfer is represented in the form of an inclination at the upper edge of the floor panels 1, this is not indispensable within the scope of the invention. The respective upper edges can also be realized without a chamfer or with another type of chamfer. According to a particular embodiment, use can be made of a chamfer performed through said decoration 3 up into the underlying substrate portion. The respective substrate portion as such then possibly can be provided with a matching or possibly contrasting uniform coloration, or the surface of the inclination can be provided with a separate decorative covering, for example, a lacquer layer or a print. For examples of such chamfers reference is made to WO 2012/004701.

FIG. 11 represents the short edges 42-43 of the floor panel 1 of FIGS. 1 to 3. Herein, an edge profile with a male part 44 and a female part 45 is applied, which allows coupling two of such floor panels 1 at the respective edges 42-43 by means of a downward movement M of the male part 44 in the female part 45, wherein in coupled condition a locking is effected in a horizontal direction H as well as in a vertical direction V. The combination of a turnable profile at the long edges 14-15, for example, according to any of the FIGS. 2 to 10, and a downward coupleable profile at the short edges 44-45, for example, according to any of the FIGS. 11 to 14, leads to the creation of a floor panel 1 which can be coupled by means of a so-called fold-down movement. Herein, the long edges 14-15 are provided in each other by a turning movement W, wherein by this turning movement W at the short edges 42-43 a downward movement M is created, which provides the male part 44 present there in the female part 45.

The example of such downward coupleable profile represented here is made in one piece with the material of the floor panel 1 and comprises, in order to effect the locking, a cooperating snap hook 46 and undercut 47, as well as a hook-shaped part 25 on the lower lip 21, which in this case also comprises an undercut 47A. The undercut 47A at the hook-shaped part 25 is made such that it forms an angle A 1 with the vertical of 1° to 10°, and preferably approximately 5°. The locking groove 26 which cooperates with the aforementioned hook-shaped part 25 is entirely positioned underneath the reinforcement layer 8 at the upper surface 10 of the foamed layer 4.

The aforementioned cooperating snap hook 46 and undercut 47 in this case in the coupled condition comprise cooperating vertically active contact surfaces 30-31, which are partially realized in the foamed layer 4 and partially in the non-foamed layer 5 situated there above. The horizontally as well as vertically active contact surfaces 27A-28A of the hook-shaped part 25 are realized entirely in the material of the foamed layer 4.

The upper surface 23 of the lower lip 21 consists entirely of material of the foamed layer 4. In coupled condition, the edge profiles also have vertically active contact surfaces 32-33 formed on this upper surface 23. Between these vertically active contact surfaces 32-33 and horizontally active contact surfaces 27A-28A, a space 40 is present. The lower reinforcement layer 9 extends in one piece in the lower lip 21, and the upper reinforcement layer 8 extends in one piece over the aforementioned locking groove 26. At the lower side of the lower lip 21, a recess 48 is realized which extends at least partially underneath said space 40. This latter provides for a smoother coupling, even with the represented overlap 38 in the contours.

FIG. 12 represents a variant of profiles which can be coupled into each other with a downward movement M, wherein the snap hook 46 is situated at the distal end 24 of the lower lip 21 of the female part 45, whereas the undercut 47 is provided in the male part 44. Here, too, the upper surface 23 of the lower lip 21 is formed entirely from the material of the foamed layer 4, and in coupled condition the edge profiles comprise vertically active contact surfaces 32-33 formed on this upper surface 23. Between these vertically active contact surfaces 32-33 and horizontally active contact surfaces 27A-28A, a space 40 is present. The lower reinforcement layer 9 extends in one piece in the lower lip 21, and the upper reinforcement layer 8 extends in one piece over said locking groove 26.

In the example of FIG. 12, too, the hook-shaped part 25 is realized with an undercut 47A, wherein this undercut 47A is realized such that it forms an angle A 1 with the vertical of 1 to 10°, and preferably approximately 5°. It is evident that in FIG. 11 as well as in FIG. 12 such undercut 47A at the location of the horizontally active contact surfaces 27A-28A on the hook-shaped part 25 is not necessary and that just as well contact surfaces 27-28 can be used which are vertical or which are inclined less steeply than the vertical, for example, with an inclination comparable to that of the horizontally active contact surfaces 27-28 of FIGS. 1 to 10, namely an inclination wherein the respective contact surfaces 27-28 enclose an angle with the horizontal of 45° to 90°.

FIG. 13 represents a variant of downwardly coupleable profiles, wherein the snap hook 46 is formed by a separate insert 49, which, in this case, is provided in the male part 44. Such separate insert 49 preferably is also formed of thermoplastic material, for example, at least of PVC or ABS (Acrylonitrile butadiene styrene), and in coupled condition preferably, such as here, comprises a vertically active contact surface 50 with the material of a non-foamed layer 7 of the female part 45. In this manner, an exact vertical positioning of the male part 44 in the female part 45 can be achieved. In this example, said separate insert 49 is situated in a seat with upper walls 51 which are formed of non-foamed material, and lower walls 52 which are formed of foamed material.

FIG. 14 represents still another example of profiles which can be coupled into each other in downward direction, wherein in this example the undercut 47 is formed by a separate insert 49, which to this aim, in this case, is provided in the female part 45. Such separate insert 49 preferably is also formed of thermoplastic material, for example, at least of PVC or ABS (Acrylonitrile butadiene styrene) and, in coupled condition, such as here, preferably comprises a vertically active contact surface 50 with the material of a foamed layer of the male part 44. Said separate insert 49 is situated in a seat with upper walls 51 which are formed of non-foamed material, and lower walls 52 which are formed of foamed material.

Relating to FIGS. 13 and 14, it is also noted that it is advantageous to also have non-foamed material above the seat of the separate insert 49, preferably with a plasticizer content of less than 12 phr, and still better of less than 7 phr. Namely, in this manner, it is achieved that the risk of deformation of the upper surface of the floor panels 1 due to force effects during coupling or in the coupled condition is minimized.

It is clear that the hook-shaped part 25, the cooperating therewith locking groove 26 at the male part 44, respectively, in the examples of FIGS. 11 to 14 respectively extends up into the upper half of the substrate, thus, to above the level C.

It is clear that the edge profiles of FIGS. 11 to 14 can be realized in various alternative manners, wherein the contact surfaces present can be realized on different substrate portions, similar to the in the introduction herein above-mentioned possibilities for tongues and/or grooves, however, wherein the tongue 19 is replaced by a whether or not one-piece snap hook 46, and the groove 17 is formed by an undercut 47, whether or not provided by a separate insert 49.

Further, it is clear that the edge profiles from FIGS. 2 through 10 can also be applied on the short edges 42-43, wherein then the same or not the same profile is applied at the long edges 14-15 as well as at the short edges 42-43.

It is also noted that edge profiles, such as those of FIGS. 11 to 14, of course also can be applied in other substrates 2 with the characteristics of the invention, such as, for example, in the substrates 2 of FIGS. 4 to 6 and 8 to 10.

FIG. 15 schematically represents some steps in a possible method for manufacturing floor panels 1.

The method comprises the step S1 of providing a thermoplastic material 53. In this case, this step S1 is performed three times by means of three separate strewing treatments 54A-54B-54C. The method further also comprises the step S2 of providing a prefabricated sheet, in this case two glass fiber mats 8-9, which respectively are situated between two of the aforementioned three strewn materials.

In a first strewing treatment 54A, the material is strewn for a first layer which is not to be foamed. In a second strewing treatment 54B, the material is strewn for a first layer which is to be foamed. In a third strewing treatment 54C, the material is strewn for a second layer which is not to be foamed. It is clear that the composition provided by means of the second strewing treatment 54B is at least different from that of the first and third strewing treatments 54A-54C. Said glass fleeces 8-9 form an effective separation between these materials. Moreover, they carry the strewn material, together with the underlying transport belt 55, through the continuous production process. It is clear that the strewing treatments 54A-54B-54C described herein above can be applied for obtaining a substrate portion with a central foamed layer 4, which, on both surfaces 10-11, is provided with a glass fiber mat 8-9 and an adjacent thereto non-foamed layer 5-6, similar to the foamed layer 4, reinforcement layers 8-9 and a first and second non-foamed layer 5-6 from the examples of FIGS. 2 to 8 and 11 to 14.

In a subsequent step S3, at least the material of the second strewing treatment 54B is foamed in the presence of the aforementioned glass fiber mats 8-9. This is performed between the belts of a double-belt press 56. The double-belt press 56 is heated in a first part 57 and cooled in a second part 58. The obtained foam can have an impact on the heat transfer in the press, considering that it can function as an insulator. In order to avoid an overly large impact on the line speed, the strewn material preferably is preheated before being treated in the press.

Following the press treatment, in a step 4 a further substrate layer 60 can be deposited on the surface of the obtained substrate portion 59, in liquid condition, for example by means of a so-called calendering treatment 61. Referring to FIGS. 2 to 7, it is also noted that this further substrate layer 60, for example, may relate to the mentioned there third, non-foamed layer 7.

It is noted that, in a step not further represented here, the method can be continued by applying a decoration 3, possibly in the form of a printed foil 12, and a wear layer 13, which possibly can comprise a lacquer layer 37.

As described in the introduction, it is possible to connect one or more of the prefabricated sheets, namely, the glass fiber mats 8-9, to the thermoplastic material 53 under tension, for example, by pulling at it in longitudinal direction.

The invention claimed is:

1. A floor panel with a substrate and a decoration provided thereon, said decoration comprising a printed motif, wherein the substrate comprises at least a first and a second substrate layer;

wherein said first substrate layer is a layer of foamed polyvinyl chloride which comprises at least 30 phr of filler materials, and comprises a first content of plasticizers of 0 to 12 phr; said first substrate layer being positioned centrally in the substrate, thus forming at least a substrate portion present in a center of a thickness of the substrate; said first substrate layer forming at least 30 percent of the thickness of said substrate;

wherein said second substrate layer is a layer of plasticized polyvinyl chloride wherein said second substrate layer comprises a second content of plasticizer larger than said first content; wherein said second substrate layer is positioned between said first substrate layer and said decoration;

wherein said first substrate layer is a foamed layer obtained at least by means of a chemical foaming process, wherein the polyvinyl chloride comprises hollow spaces filled with a gaseous reaction product remaining present in the form of bubbles.

2. The floor panel of claim 1, wherein said filler materials comprise mineral filler materials.

3. The floor panel of claim 2, wherein said mineral filler materials are selected from chalk and talc.

4. The floor panel of claim 1, wherein said filler materials comprise fillers that as such comprise one or more hollow spaces.

5. The floor panel of claim 1, wherein said first substrate layer is a closed cell foam layer.

6. The floor panel of claim 1, wherein said first substrate layer is a foamed layer obtained at least by means of a mechanical foaming process.

7. The floor panel of claim 1, wherein said second substrate layer is foamed.

8. The floor panel of claim 1, wherein said printed motif is applied to a thermoplastic foil or on one or more primer layers available as intermediate layers on said substrate.

9. The floor panel of claim 1, wherein said floor panel further comprises a translucent or transparent wear layer provided above said decoration.

10. The floor panel of claim 1, wherein said substrate further comprises an additional foamed layer at its underside, wherein said additional foamed layer is attached to the remaining substrate portions by means of a glue connection.

11. The floor panel of claim 1, wherein said floor panel on at least two opposite edges if provided with coupling means which allow coupling two of such floor panels together, wherein at the respective edges a locking is effected at least in a vertical direction perpendicular to a plane of the panels, wherein at least one of said edges is provided with a groove, the deepest point of which is situated in said first substrate layer.

12. The floor panel of claim 11, wherein said groove is bordered by an upper lip and a lower lip and wherein the lower surface of said upper lip is at least partially formed in said first substrate layer.

13. The floor panel of claim 1, wherein the hollow spaces of the foamed layer reduce density of the polyvinyl chloride by at least 10%, and wherein the foamed layer comprises a varying proportion of the hollow spaces across a thickness of the foamed layer having a highest proportion of hollow spaces arranged centrally in the foamed layer.

14. The floor panel of claim 1, wherein the gaseous reaction product is nitrogen.

15. A floor panel with a substrate and a decoration provided thereon, said decoration comprising a printed motif applied to a thermoplastic foil, wherein said floor panel further comprises a translucent or transparent wear layer provided above said decoration; wherein the substrate comprises at least a first and a second substrate layer;

wherein said first substrate layer is a layer of closed cell foamed polyvinyl chloride which comprises at least 30 phr of filler materials, and comprises a first content of plasticizers of 0 to 12 phr; said first substrate layer being positioned centrally in the substrate, thus forming at least a substrate portion present in a center of a thickness of the substrate; said first substrate layer forming at least 30 percent of the thickness of said substrate; wherein said filler materials comprise mineral filler materials selected from chalk and talc;

wherein said second substrate layer is a layer of plasticized polyvinyl chloride wherein said second substrate layer comprises a second content of plasticizer larger than said first content; wherein said second substrate layer is positioned between said first substrate layer and said decoration;

wherein said floor panel on at least two opposite edges if provided with coupling means which allow coupling two of such floor panels together, wherein at the respective edges a locking is effected at least in a vertical direction perpendicular to a plane of the panels, wherein at least one of said edges is provided with a groove, the deepest point of which is situated in said first substrate layer;

wherein said first substrate layer is a foamed layer obtained using a chemical foaming process, wherein the polyvinyl chloride comprises hollow spaces filled with a gaseous reaction product remaining present in the form of bubbles.

16. The floor panel of claim 15, wherein said first substrate layer is a foamed layer obtained at least by means of a mechanical foaming process.

17. The floor panel of claim 15, wherein said second substrate layer is foamed.

18. The floor panel of claim 15, wherein said substrate further comprises an additional foamed layer at its underside, wherein said additional foamed layer is attached to the remaining substrate portions by means of a glue connection.

19. The floor panel of claim 15, wherein said groove is bordered by an upper lip and a lower lip and wherein the lower surface of said upper lip is at least partially formed in said first substrate layer.

\* \* \* \* \*